(12) United States Patent
Hara et al.

(10) Patent No.: US 6,940,042 B2
(45) Date of Patent: Sep. 6, 2005

(54) FLUX-CORED WIRE FOR GAS-SHIELDED ARC WELDING

(75) Inventors: Noriyuki Hara, Fujisawa (JP); Akinobu Goto, Fujisawa (JP); Hitoshi Hatano, Kobe (JP); Ken Yamashita, Fujisawa (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 82 days.

(21) Appl. No.: 10/620,386

(22) Filed: Jul. 17, 2003

(65) Prior Publication Data

US 2004/0020912 A1 Feb. 5, 2004

(30) Foreign Application Priority Data

Jul. 26, 2002 (JP) ........................................ 2002-218236

(51) Int. Cl.$^7$ ............................................... B23K 35/02
(52) U.S. Cl. .............................. 219/145.22; 219/146.1; 219/146.23
(58) Field of Search ........................... 219/145.22, 146.1, 219/146.23, 146.52; 148/23; 75/304

(56) References Cited

U.S. PATENT DOCUMENTS

| | | | | |
|---|---|---|---|---|
| 4,994,647 A | * | 2/1991 | Tanaka et al. | 219/146.23 |
| 5,430,269 A | * | 7/1995 | Natsume et al. | 219/73 |
| 6,479,796 B2 | * | 11/2002 | Goto et al. | 219/145.22 |

FOREIGN PATENT DOCUMENTS

| | | |
|---|---|---|
| JP | 62-19959 | 5/1987 |
| JP | 2-42313 | 9/1990 |
| JP | 8-13432 | 2/1996 |
| JP | 2001-314996 | 11/2001 |

\* cited by examiner

*Primary Examiner*—M. Alexandra Elve
(74) *Attorney, Agent, or Firm*—Oblon, Spivak, McClelland, Maier & Neustadt, P.C.

(57) ABSTRACT

A flux-cored wire for gas-shielded arc welding comprises a steel sheath, and a flux filled in the steel sheath. The flux-cored wire has a C content of 0.20% by mass or below, a Si content in the range of 0.06 to 1.10% by mass, a Mn content in the range of 0.55 to 1.60% by mass, a Cr content of 2.60% by mass or below, a Mo content in the range of 0.30 to 1.50% by mass, a Mg content in the range of 0.20 to 1.50% by mass, a N content in the range of 0.005 to 0.035% by mass and a B content in the range of 0.001 to 0.020% by mass on the basis of the total mass of the flux-cored wire. The flux has a $TiO_2$ content in the range of 4.2 to 8.2% by mass and a fluorine compound content in terms of F content in the range of 0.025 to 0.55% by mass on the basis of the total mass of the flux-cored wire, and the flux-cored wire has an Al content of 0.50% by mass or below, a Nb content of 0.015% by mass or below, and a V content of 0.015% by mass or below on the basis of the total mass of the flux-cored wire. The flux-cored wire forms a weld metal that is resistant to ferrite band maintains proper tensile strength and excellent toughness even if the weld metal is processed at high temperatures for a long time for PWHT. The flux-cored wire has satisfactory usability

4 Claims, 1 Drawing Sheet

FLUX-CORED WIRE FOR GAS-SHIELDED ARC WELDING

BACKGROUND OF THE INVENTION

1. Field of the Invention

The present invention relates to a flux-cored wire for gas-shielded arc welding to be used for welding materials formed of heat-resisting low alloy steels and used in various plants, such as nuclear power plants, thermal power plants and petroleum refining plants. More particularly, the present invention relates to a flux-cored wire for gas-shielded arc welding for welding materials formed of heat-resisting low alloy steels, capable of suppressing or completely preventing the formation of ferrite bands in weld metals when the weld metals are subjected to a post weld heat treatment (hereinafter, abbreviated to "PWHT") at high temperatures for a long time, of forming weld metals having high tensile strength and high toughness, and of facilitating welding work.

2. Description of the Related Art

Welding wires for gas-shielded arc welding are classified into solid wires and flux-cored wires. Flux-cored wires, as compared with solid wires, have various advantages including capabilities to cause less spattering, to form beads in satisfactory appearance and shape, and to facilitate vertical-position welding and overhead-position welding as well as flat-position welding. Accordingly, the use of flux-cored wires for welding materials formed of heat-resisting low alloy steels have progressively been increased.

Since welded structures formed by welding together materials formed of heat-resisting low alloy steels are used in high-temperature, high-pressure environments, flux-cored wires to be used for constructing such welded structures are required to have characteristics meeting working conditions required by such working environments. Generally, weld joints in materials formed of heat-resisting low alloy steels are subjected to a PWHT to reduce residual stress, to remove residual hydrogen and to improve mechanical property. Therefore, flux-cored wires for gas-shielded arc welding for welding materials formed of heat-resisting low alloy steels are required to be capable of preventing the deterioration of the characteristics of weld metals.

When a conventional flux-cored wire is used for the gas-shielded arc welding of materials formed of heat-resisting low alloy steels, ferrite bands are formed in weld metals and the mechanical properties of the weld metals are deteriorated when the weld joints are subjected to a PWHT of high temperatures and a long duration. More concretely, ferrite bands reduce the tensile strength of weld metals. It is considered that ferrite band is caused by the segregation of the component metals during the solidification of the weld metals and the migration of carbon contained in the weld metals during the PWHT.

Some techniques have been proposed to solve such problems. A technique disclosed in JP-B No. 8-13432 (hereinafter referred to "Reference 1") adds both Nb and V, which are elements having high ability to form carbides, to a flux-cored wire to suppress ferrite band through the suppression of the migration of carbon in weld metals. The inventors of the present invention proposed previously a technique in JP-A No. 2001-314996 (hereinafter referred to as "Reference 2") for suppressing ferrite band by properly adjusting the $TiO_2$, alkaline metal compound and fluoride contents of a titania flux-cored wire on the basis of knowledge that the improvement of the stability of arcs reduces the segregation of the components of alloys forming the weld metals and the resulting ferrite band and improves the mechanical properties of the weld metals. A technique for improving the toughness of weld metals that adds N in wires in a proper N content is disclosed in JP-A No. 57-4397 and JP-B No. 62-19959 (hereinafter referred to as "Reference 3"). A zirconia flux-cored wire proposed in JP-B Nos. 2-42313 and 3-3558 (hereinafter referred to as "Reference 4") reduces the $TiO_2$ content of the flux, i.e., a source of Ti, and the Ti content of the wire to the least possible extent by prescribing $TiO_2$ content and metal Ti content under predetermined limiting conditions or by prescribing $TiO_2$ content and metal Ti content under predetermined limiting conditions and limiting N content to a proper range on the basis of knowledge that Ti contained in the weld metals reduces the toughness of the weld metals.

Although the technique disclosed in Reference 1 that adds Nb and V to a flux-cored wire is effective in suppressing the migration of carbon to prevent ferrite band. Nb and V are elements that reduce the toughness of weld metals greatly. Thus, Reference 1 is unsatisfactory in ensuring that weld metals have sufficient toughness. Reference 2 has difficulty in meeting demand for higher toughness. Reference 3 does not disclose any technique for preventing ferrite band and does not disclose any technique for ensuring that weld metals have satisfactory toughness, and preventing ferrite band. The zirconia flux-cored wire disclosed in Reference 4 is inferior to titania flux-cored wires in wire usability in a vertical position and an overhead position.

SUMMARY OF THE INVENTION

The present invention has been made in view of the foregoing problems and it is therefore an object of the present invention to provide a flux-cored wire for gas-shielded arc welding, capable of forming weld metals resistant to the formation of ferrite bands therein even when the weld metals are subjected to a high-temperature PWHT for a long time, and of forming weld metals having high toughness.

According to the present invention, a flux-cored wire for gas-shielded arc welding comprises: a steel sheath, and a flux packed in the steel sheath; wherein the flux-cored wire has, on the basis of the total mass of the flux-cored wire, a C content of 0.20% by mass or below, a Si content in the range of 0.06 to 1.10% by mass, a Mn content in the range of 0.55 to 1.60% by mass, a Cr content of 2.60% by mass or below, a Mo content in the range of 0.30 to 1.50% by mass, a Mg content in the range of 0.20 to 1.50% by mass, a N content in the range of 0.005 to 0.035% by mass and a B content in the range of 0.001 to 0.020% by mass; the flux has, on the basis of the total mass of the flux-cored wire, a $TiO_2$ content in the range of 4.2 to 8.2% by mass and a fluorine compound content in the range of 0.025 to 0.55% by mass in terms of F content; and the flux-cored wire has, on the basis of the total mass of the flux-cored wire, an Al content of 0.50% by mass or below, a Nb content of 0.015% by mass or below, and a V content of 0.015% by mass or below.

In the flux-cored wire for gas-shielded arc welding according to the present invention, it is preferable that the Mn content is in the range of 0.55 to 1.45% by mass on the basis of the total mass of the flux-cored wire. It is preferable that the flux-cored wire for gas-shielded arc welding according to the present invention contains at least one selected from the group consisting of Ti other than $TiO_2$ in a Ti content in the range of 0.005 to 0.3% by mass and Zr in a Zr content in the range of 0.002 to 0.3% by mass on the basis of the total mass of the flux-cored wire. It is preferable that the flux-cored wire according to the present invention meet a condition that the ratio of total Ti content to N content is in the range of 250 to 500 (the total Ti content and the N content are the Ti content and the N content on the basis of the total mass of the flux-cored wire).

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
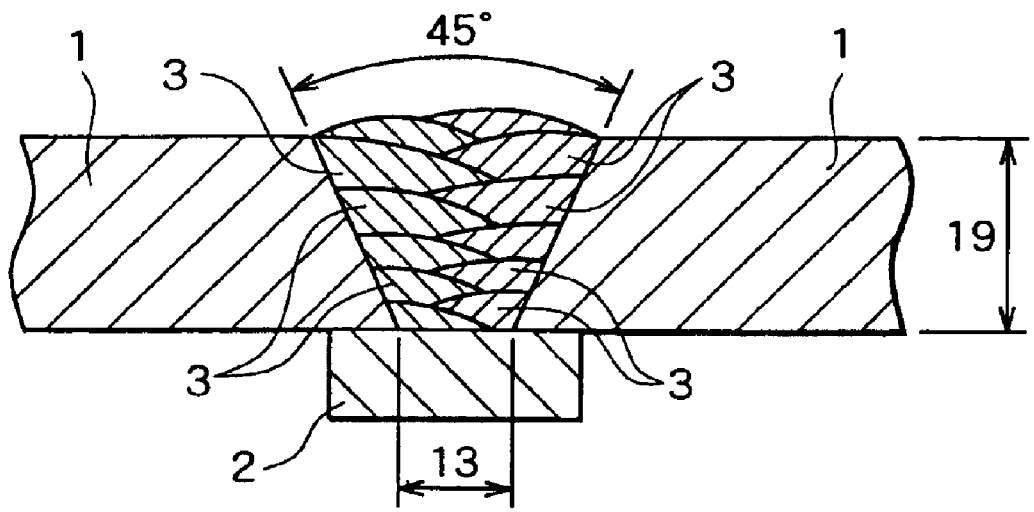
FIG. 1 is a typical sectional view of workpieces provided with a groove for an example and a comparative example.

Referring to the drawings, an embodiment of the present invention will be described below.

The inventors of the present invention made tests and studies earnestly to solve the foregoing problems. Conventional titania flux-cored wires respectively having different Nb and V contents for welding materials formed of a heat-resisting low alloy steel containing 1.25% Cr and 0.5% Mo were used. Test pieces formed of a steel containing 1.25% Cr and 0.5% Mo were welded by using the foregoing flux-cored wires. Weld metals thus obtained were subjected to a high-temperature PWHT for a long time, and then the microstructure of the weld metals was observed. The PWHT heated the weld metals at 690° C. for 9.5 hr, and then the weld metals were cooled by furnace cooling.

The observation of the microstructure of the weld metals showed that various precipitates containing Nb, V and Ti produced through the reduction of $TiO_2$ were distributed in grains and grain boundaries of the weld metals. It was known that grain boundaries were fixed by the pinning effect of those precipitates, i.e., an effect to fixate the present state by preventing the migration of atoms and grain boundaries, and, consequently, ferrite band was suppressed. It was known that the pinning effect of various precipitates containing Ti and other elements suppressed the migration of grain boundaries during the PWHT and thereby ferrite band was suppressed.

It was known that the suppression of the migration of grain boundaries during the PWHT by the pinning effect of various precipitates containing Ti and other elements suppressed ferrite band. Such a ferrite band suppressing method is different from a conventional ferrite band suppressing method that adds Nb and/or V in weld metals to precipitate a Nb carbide and/or V carbide to suppress ferrite band by suppressing the migration of C atoms during PWHT. According to the present invention, a flux-cored wire having a flux containing titania is used as a Ti source for supplying Ti as a pinning material. Ti produced by reducing $TiO_2$ inevitably contained in weld metals is combined with N to produce a TiN precipitate.

The present invention has been made on the basis of the aforesaid knowledge and idea. The followings are essential conditions to be satisfied to achieve the object of the present invention.

(1) Promoting the reduction of $TiO_2$ by adding proper amounts of Si, Mn, Mg and F compounds to weld metals, and precipitate of TiN by adding a proper amount of N to weld metals and reducing $TiO_2$ to produce Ti, to restrict the formation of ferrite band effectively (2) Fining microstructures by adding a proper amount of B to weld metals to enhance the toughness of the weld metals, regulating Nb and V contents of weld metals to prevent the reduction of the toughness of weld metals due to the precipitate of MX-type Nb and V carbides during PWHT, and regulating Al content to prevent the reduction of the toughness of weld metals due to embrittlement (3) Optimizing arc stabilizer content, such as $TiO_2$ content and fluorine compound content, to ensure satisfactory welding work, forming slag having satisfactory viscosity, and preventing spattering Limiting conditions on the composition of flux-cored wires according to the present invention for gas-shielded arc welding will be described below. The content of the component of a flux-cored wire is expressed in percent by mass on the basis of the total mass of the wire.

C Content: 0.2% by Mass or Below

Carbon enhances the hardenability of steels and improves the tensile strength and toughness of weld metals. Therefore, carbon is added to either the steel sheath or the flux or both the steel sheath and the flux of the flux-cored wire. If the C content of the flux-cored wire is greater than 0.20% by mass, the tensile strength of the weld metal is excessively high, the toughness of the weld metal is very low and hot cracking is liable to occur in the weld metal. Thus, the carbon content of the flux-cored wire must be 0.20% by mass or below. Carbon, such as graphite, or an alloy, such as chromium carbide, Si—C, high C—Fe—Mn or high C—Fe—Cr, is used to add carbon to the flux. Preferably, the carbon content of the flux-cored wire is 0.03% by mass or above.

Si Content: 0.06 to 1.10% by Mass

Silicon serves as a deoxidizer for deoxidizing the weld metal. Silicon increases the viscosity of the weld metal and has an effect to adjust the shape of a bead. Silicon has the effect of promoting the reducing reaction of $TiO_2$ and stabilizing the recovery of B into the weld metal. Silicon is added to either the steel sheath or the flux, or to both the wire and the flux for those purposes. However, if the Si content of the flux-cored wire is below 0.06% by mass, the deoxidizing effect of silicon is insufficient, blow holes are liable to be formed in the weld metal, beads of unsatisfactory shapes are formed due to the insufficient viscosity of the weld metal, and a sufficient amount of TiN effective in suppressing ferrite band cannot be produced due to the insufficient reduction of $TiO_2$. Moreover, if the Si content of the flux-cored wire is below 0.06% by mass, the recovery of B in the weld metal is low, the microstructure of the weld metal cannot be fined and the toughness of the weld metal is low. If the Si content of the flux-cored wire is greater than 1.10% by mass, the tensile strength of the weld metal is excessively high, and the toughness of the weld metal decreases because $TiO_2$ is reduced excessively and the solid solution of Ti increases. Therefore, the Si content must be in the range of 0.06 to 1.10% by mass. An alloy, such as Fe—Si, Fe—Si—Mn or Fe—Si—Cr is used to add Si to the flux.

Mn Content: 0.55 to 1.60% by Mass (Preferably, 0.55 to 1.45% by Mass)

Manganese serves as a deoxidizer for deoxidizing the weld metal, enhances the hardenability of the weld metal, and improves the tensile strength and toughness of the weld metal. Manganese, similarly to Si, promotes the reduction reaction of $TiO_2$ and stabilizes the recovery of B into the weld metal. Mn is added to either the steel sheath or the flux or to both the steel sheath and the flux for those purposes. If the Mn content of the flux-cored wire is 0.55% by mass or below, the deoxidizing effect of Mn is insufficient, blow holes are liable to be formed, the tensile strength of the weld metal is insufficient, and a sufficient amount of TiN effective in suppressing ferrite band cannot be produced due to the insufficient reduction of $TiO_2$. If the Mn content of the flux-cored wire is 0.55% by mass or below, the recovery of B into the weld metal decreases, the microstructure of the weld metal cannot be fined and the toughness of the weld metal decreases. On the other hand, if the Mn content of the flux-cored wire is greater than 1.60% by mass, the shape of beads formed by vertical-position welding and overhead-position welding is deteriorated greatly due to the excessively high fluidity of the molten weld metal, the tensile strength of the weld metal is excessively high, the amount of the solid solution of Ti increases due to the excessive reduction of $TiO_2$ to reduce the toughness of the weld metal. Thus, the Mn content of the flux-cored wire must be in the range of 0.55 to 1.6% by mass. It is preferable that the Mn content of the flux-cored wire is 1.45% by mass or below because beads can be formed in a satisfactory shape if the Mn content of the flux-cored wire is 1.45% by mass or below. For the foregoing purposes, a metal, such as metal Mn, an alloy, such as Fe—Mn, or Fe—Si—Mn is used to add Mn to the flux.

Cr Content: 2.6% by Mass or Below

Chromium is an important component of a heat-resisting low alloy steel and has an effect of improving the tensile strength of the weld metal. Chromium is added to either the steel sheath or the flux or to both the steel sheath and the flux for that effect. The Cr content of the flux-cored wire is adjusted properly according to the quality of a metal to be welded. On the other hand, the tensile strength of the weld metal is excessively high and the toughness of the weld metal is low if the Cr content of the flux-cored wire is greater than 2.60% by mass. Thus, the Cr content of the flux-cored wire must be 2.6% by mass or below. A metal, such as metal Cr, or an alloy, such as Fe—Cr, is used to add Cr to the flux. Preferably, the Cr content of the flux-cored wire is 0.10% by mass or above.

Mo Content: 0.30 to 1.50% by Mass

Molybdenum, similarly to Cr, is an important component of a heat-resisting low alloy steel and has an effect of improving the tensile strength of the weld metal. Molybdenum has the effect of increasing the resistance to temper softening of the weld metal and suppressing the reduction of the tensile strength by the PWHT. Molybdenum is added to either the steel sheath or the flux or to both the steel sheath and the flux for that effect. The Mo content of the flux-cored wire is adjusted properly according to the quality of a metal to be welded. The tensile strength of the weld metal is insufficient if the Mo content of the flux-cored wire is less than 0.30% by mass. On the other hand, the tensile strength of the weld metal is excessively high and the toughness of the weld metal is low if the Mo content of the flux-cored wire is greater than 1.50% by mass. Thus, the Mo content of the flux-cored wire must be in the range of 0.30 to 1.50% by mass. A metal, such as metal Mo, or an alloy, such as Fe—Mo, is used to add Mo to the flux.

Mg Content: 0.20 to 1.50% by Mass

Magnesium is a potent deoxidizer for deoxidizing the metal weld and is added to the flux-cored wire to enhance the toughness of the weld metal. Preferably, Mg is added to the flux for such an action and such an effect. Magnesium, similarly to Si and Mn, has the effect of promoting the reduction reaction of $TiO_2$ and stabilizing the recovery of B into the weld metal. Magnesium is added to either the steel sheath or the flux or to both the steel sheath and the flux for those effects. If the Mg content of the flux-cored wire is less than 0.20% by mass, the deoxidizing effect of Mg is insufficient, blow holes are liable to be formed, the amount of oxygen increases and the toughness of the weld metal is low. Moreover, if the Mg content of the flux-cored wire is less than 0.20% by mass, a sufficient amount of TiN that suppresses ferrite band cannot be produced due to the insufficient reduction of $TiO_2$, the recovery of B into the weld metal is low, the microstructure cannot be fined and the toughness of the weld metal is low. On the other hand, if the Mg content of the flux-cored wire is greater than 1.50% by mass, spattering intensifies, the covering ability of slag deteriorates, the shape of beads formed by vertical-position welding and overhead-position welding is deteriorated, the toughness of the weld metal is reduced because $TiO_2$ is reduced excessively and the amount of the solid solution of Ti increases. Thus, the Mg content of the flux-cored wire is in the range of 0.20 to 1.50% by mass. A Mg source is a metal Mg or a Mg alloy, such as Si—Mg or Ni—Mg.

N Content: 0.005 to 0.035% by Mass

Nitrogen combines with Ti to precipitate TiN having the effect of suppressing ferrite band in the weld metal. N has the effect of fixating the solid solution of Ti in a nitride to improve the toughness of the weld metal. Nitrogen is added to either the steel sheath or the flux or to both the steel sheath and the flux for those effects. If the N content of the flux-cored wire is less than 0.005% by mass, the effect of suppressing ferrite band is unavailable due to the insufficient precipitate of the nitride as well as the solid solution of Ti cannot be reduced and the toughness of the weld metal is low. On the other hand, if the N content of the flux-cored wire is greater than 0.035% by mass, the toughness of the weld metal is reduced due to the increase of the solid solution of N, excessive N forms blow holes and slag removability deteriorates. Thus, the N content of the flux-cored wire must be in the range of 0.005 to 0.035% by mass. A metal nitride, such as N—Cr, N—Si or N—Ti, is used to add N to the flux-cored wire.

B Content: 0.001 to 0.020% by Mass

Boron has the effect of fining the microstructue of the weld metal and improving the toughness of the weld metal. Boron is added to either the steel sheath or the flux or to both the steel sheath and the flux for that effect. The toughness improving effect of B is insufficient if the B content of the flux-cored wire is less than 0.001% by mass. On the other hand, the weld metal is subject to hot cracking if the B content of the flux-cored wire is greater than 0.020% by mass. Thus, the B content of the flux-cored wire is in the range of 0.001 to 0.020% by mass. An alloy, such as Fe—B or Fe—Si—B, or a boron oxide, such as $B_2O_3$, is used to add B to the flux. When a boron oxide is added to the flux, the B content is adjusted on the basis of the boron oxide content in terms of B content.

$TiO_2$ Content: 4.2 to 8.2% by Mass

Titanium oxide is a principal slag-forming material and serves as an arc stabilizer. Part of $TiO_2$ is reduced by Si, Mn, Mg and a fluorine compound to produce Ti, and the Ti combines with N to precipitate TiN in the weld metal. The TiN thus precipitated is very effective in suppressing ferrite band. Since $TiO_2$ is a principal slag-forming material and the reduction reaction of part of $TiO_2$ occurs easily in a hot atmosphere, $TiO_2$ is contained in the flux to promote the reduction reaction of $TiO_2$. If the $TiO_2$ content of the flux is less than 4.2% by mass, arcs become unstable, welding work becomes practically impossible and only a small amount of Ti is produced by reduction and, the effect of $TiO_2$ in suppressing ferrite band is insufficient because a small amount of Ti is produced by reduction and the amount of precipitated TiN decreases. On the other hand, if the $TiO_2$ content of the flux is greater than 8.2% by mass, slag has a very high viscosity causing welding defects including slag inclusion, slag inclusion increases the amount of oxygen contained in the weld metal to reduce the toughness of the weld metal. Thus, the $TiO_2$ content of the flux must be in the range of 4.2 to 8.2% by mass.

Fluorine Compound Content in Terms of F Content: 0.025 to 0.55% by Mass

A fluorine compound serves as an arc stabilizer. A fluoride compound has effects of lowering the melting point of slag, improving the fluidity and covering ability of slag, forming beads in a satisfactory shape. Fluorine gas produced by the decomposition and gasification of a fluorine compound by arcs has effect of stirring the molten metal to promote the separation of slag from the molten metal and reducing the amount of oxygen contained in the weld metal. A fluorine compound, similarly to Si, Mn and Mg, has effects of making Ti produced by reducing $TiO_2$ combine with N to precipitate TiN in the weld meal to suppress ferrite band, and stabilizing the recovery of B into the weld metal. Since a fluorine compound serves as one of a slag-forming materials and the reduction reaction of part of $TiO_2$ occurs easily in a hot atmosphere, the fluorine compound is added to the flux to promote the reduction reaction of $TiO_2$. If the fluorine compound content in terms of F content of the flux is less than 0.025% by mass, this effect is unavailable, arcs are unstable, spattering intensifies and the shape of beads is deteriorated. Moreover, if the fluorine compound content in terms of F content of the flux is less than 0.025% by mass, blow holes are liable to be formed due to the insufficient effect of reducing the amount of oxygen contained in the weld metal microstructure cannot be fined due to the reduction of the recovery of B into the weld metal to reduce the toughness of the weld metal Still further, if the fluorine compound content in terms of F content of the flux is less than 0.025% by mass, since the amount of Ti produced through the reduction of $TiO_2$ is small due to the insufficient reduction of $TiO_2$, the amount of precipitated TiN is small and sufficient effect of suppressing ferrite band is unavailable. On the other hand, if the fluorine compound content in terms of F content of the flux is greater than 0.55% by mass, the fluidity of slag is excessively high, the covering performance is spoiled and the shape of beads is deteriorated significantly. Thus, the fluorine content in terms of F content of the flux must be in the range of 0.025 to 0.55% by mass. Possible fluorine compounds are LiF, NaF, $K_2SiF_6$, $CaF_2$, $MgF_2$, $BaF_2$, $CeF_3$ and a fluorine oil containing $CF_2$. The flux-cored wire may be coated with the fluorine oil containing $CF_2$ to use the fluorine oil as a lubricant.

Al Content: 0.50% Mass or Below

Aluminum serves as a deoxidizer for deoxidizing the weld metal and has effects of preventing the formation of blow holes in beads and transferring droplets in spray. Aluminum is added to either the steel sheath or the flux or to both the steel sheath and the flux for the aforesaid effects. If the Al content of the flux-cored wire is greater than 0.50% by mass, since the weld metal hardens and becomes brittle, the tensile strength of the weld metal is excessively high and the toughness of the weld metal is very low. Thus, the Al content of the flux-cored wire must be 0.50% by mass or below. Alumina contained in the flux-cored wire is decomposed by high-temperature arcs and Al is produced. Therefore, an $Al_2O_3$ content is converted into an equivalent Al content. Preferably, the Al content of the flux-cored wire is 0.03% by mass or above.

Nb Content: 0.015% by Mass or Below

Niobium contained in the weld metal makes carbides contained in the weld metal precipitate. The carbides thus precipitated have an effect of suppressing the migration of atoms during PWHT and suppressing ferrite band. However, Nb combines with C to form a minute, MX-type carbide when subjected to PWHT. The MX-type carbide reduces the toughness of the weld metal significantly if the Nb content of the flux-cored wire is greater than 0.015% by mass. Thus, the Nb content of the flux-cored wire must be 0.015% by mass or below. The niobium oxide content is converted into an equivalent Nb content.

V Content: 0.015% by Mass or Below

Vanadium contained in the weld metal, similarly to Nb, makes carbides contained in the weld metal precipitate to suppress ferrite band by suppressing the migration of C atoms during PWHT. However, V combines with C to form a minute, MX-type carbide when subjected to PWHT. The MX-type carbide reduces the toughness of the weld metal significantly if the V content of the flux-cored wire is greater than 0.015% by mass. Thus, the V content of the flux-cored wire must be 0.015% by mass or below. The vanadium oxide content is converted into an equivalent V content.

Ti Content: 0.005 to 0.3% by Mass

Titanium serves as a deoxidizer for deoxidizing the weld metal and has effects of improving the toughness of the weld metal. Titanium combines and produces TiN that is effective in suppressing ferrite band. Thus, it is preferable to add a proper amount of Ti to the flux-cored wire to improve the toughness of the weld metal and to suppress ferrite band. Titanium is added to either the steel sheath or the flux or to both the steel sheath and the flux for the aforesaid effects. An acid-soluble Ti-containing substance is added to the steel sheath. Metal Ti or a Ti-bearing alloy, such as Fe—Ti, is added to the flux. Differing to Ti produced through the reduction of $TiO_2$, Ti contained in such a form in the flux-cored wire is not subject to the reducing effect of deoxidizers other than Ti, such as Si, Mn and Mg, and remains in the weld metal. Thus, the recovery of Ti into the weld metal is satisfactory and Ti can stably contained in the weld metal. Titanium contained in $TiO_2$ is acid-insoluble Ti. The toughness of the weld metal cannot be improved if the weld metal contains Ti in a form other than $TiO_2$, i.e., acid-soluble Ti, in a Ti content less than 0.005% by mass of the flux-cored wire. If the weld metal contains Ti in an acid-soluble Ti, in a Ti content greater than 0.3% by mass of the flux-cored wire of the flux-cored wire, the tensile strength of the weld metal is excessively high, the amount of the solid solution of Ti is large and the toughness of the weld metal is low. Thus, the Ti content of the flux-cored wire in terms of Ti other than $TiO_2$ is in the range of 0.005 to 0.3% by mass of the flux-cored wire.

Zr Content: 0.002 to 0.3% by Mass

Zirconium serves as a deoxidizer and has an effect of improving the toughness of the weld metal. Zirconium contained in the flux-cored wire improves the toughness of the weld metal additionally. Therefore, it is preferable that the flux-cored wire contains Zr in a proper Zr content to further improve the toughness of the weld metal. Zirconium is added to either the steel sheath or the flux or to both the steel sheath and the flux for such an effect. Zirconium is unable to further improve the toughness of the weld metal when the Zr content of the flux-cored wire is less than 0.002% by mass. The Zr content of the flux-cored wire exceeding 0.3% by mass does not exercise any particular effect. Thus, the Zr content of the flux-cored wire must be in the range of 0.002 to 0.3% by mass of the flux-cored wire. Metal Zr or a Zr bearing alloy, such as Fe—Zr or Fe—Si—Zr, is used for adding Zr to the flux.

The respective actions and effects of Ti and Zr contained in the flux-cored wire are independent of each other. Therefore, it is preferable that the flux-cored wire contains either Ti or Zr and it is more preferable that the flux-cored wire contains both Ti and Zr.

Ratio of Total Ti Content to N Content: 250 to 500

Both the solid solution of Ti and the solid solution of N contained in the weld metal are reduced and the toughness of the weld metal is further improved by adjusting the quantities in percent by mass of the components of the flux-cored wire so that the ratio of the total Ti content of the flux-cored wire, i.e., the sum of a Ti content based on Ti contained in the form of $TiO_2$ in the flux-cored wire, and a Ti content based on Ti contained in the steel sheath and/or the flux to the N content of the flux-cored wire, i.e., (Total Ti content)/(N content) is in the range of 250 to 500.

A desired flux-cored wire of the present invention to be used for welding materials formed of heat-resisting low alloy steels by gas-shielded arc welding can be obtained when the flux-cored wire has the foregoing composition. Therefore, there are not any particular restrictions on the quantity in percent by mass and the composition of the slag-forming materials contained in the flux-cored wire. The slag-forming materials contain nonmetallic components and form slag that covers the molten metal to isolate the molten metal from the ambient atmosphere around the weld joints during gas-shielded arc welding. More specifically, the slag-forming materials are $TiO_2$, which is one of the components of the flux-cored wire for which contents are specified, the fluorine compound, $Al_2O_3$, boron oxide, niobium oxide and vanadium oxide, substances for the fine adjustment of the basicity of slag or the melting point, viscosity and fluidity of slag, such as $ZrO_2$, $SiO_2$, $CaO$ and $MgO$, and substances for the fine adjustment the condition of arcs, such as $K_2O$ and $Na_2O$.

There is not any particular restriction on the quality and composition of the steel sheath of the flux-cored wire of the present invention, provided that the quality and composition of all the components of the flux-cored wire including the steel sheath and the flux meet the specified conditions.

The flux of the flux-cored wire of the present invention does not need to be filled in the steel sheath in a particularly specified flux ratio. The flux ratio may properly be determined, taking into consideration the productivity of the flux-cored wire, and process conditions, such as the possibility of breakage of the steel sheath during forming and drawing. Preferable flux ratio is in the range of, for example, 11.0 to 18.0% by mass.

The shielding gas may be any one of $CO_2$ gas, an Ar—$CO_2$ mixed gas of any suitable composition, an Ar—$O_2$ mixed gas of any suitable composition and an Ar—$CO_2$—$O_2$ mixed gas of any suitable composition. Preferably, the composition of the steel sheath may selectively be determined according to the composition of materials to be welded. Possible materials of the steel sheath include mild steels and alloy steels. There is not any particular restriction on the sectional shape of the steel sheath; the steel sheath may be either a seamed tube or a seamless tube.

The flux-cored wire of the present invention may contain, when necessary, components other than those mentioned above, such as Cu, Ni, Co and/or W to meet abilities required of the material to be welded. When the steel sheath is a seamless tube, the surface of the steel sheath may be plated with Cu, Ni or a composite material.

As mentioned above, it is one of the features of the present invention to promote the reduction of $TiO_2$ by adding proper quantities of Si, Mn, Mg and fluorine compound to the weld metal. It is possible to reduce $TiO_2$ satisfactorily, provided that Si, content, Mn content, Mg content and fluorine compound content are in the aforesaid ranges, respectively.

EXAMPLES

The effects of flux-cored wires of the present invention in examples will be described in comparison with those of flux-cored wires in comparative examples.

Flux-cored wires listed in Tables 3 to 11 were fabricated, using sheaths of mild steels (sheath types A and B) and those of Cr—Mo steels (sheath types C and D) respectively having chemical compositions shown in Tables 1 and 2. The respective outside diameters of all the flux-cored wires were 1.2 mm. Test plates 1, i.e., workpieces, of heat-resisting low alloy steels having a thickness of 19 mm, and spaced by a groove shown in FIG. 1 were subjected to butt gas-shielded arc welding under welding conditions shown in Tables 12 and 13. The heat-resisting low alloy steels were a 0.5% Mo steel (A204, Gr. A, JIS), a 1.25% Cr-0.5% Mo steel (A387 Gr. 11, Cl. 2, JIS), a 2.25% Cr-1.0% Mo steel (A387, G4. 22, Cl. 2, JIS). Table 12 shows the welding conditions for forming weld metals to be subjected to performance tests, and Table 13 shows the welding conditions for usability tests. The groove formed between the plates 1 was a V-groove having a groove angle of 45° and a root gap of 13 mm.

Test welding were performed for the following test items and performance evaluation items.

(1) Evaluation of the Performance of Weld Metals

Weld metals were made by flat-position welding using flux-cored wires in Comparative examples 1 to 29 shown in Tables 3 to 6 and flux-cored wires in Examples 1 to 35 shown in Tables 7 to 11 under welding conditions for flat-position welding shown in Table 12. The weld metals were examined by radiographic examination. It was decided that the weld metals having qualities meeting those specified in Z3104 1, JIS were good and the rest were bad.

The weld metals were subjected to tensile tests and Charpy impact tests after PWHT. Only the weld metal made by welding the plates 1 of the 0.5% Mo steel by using the flux-cored wire in Example 7 was kept at 620° C. for 1 hr and cooled by furnace cooling for PWHT, while the weld metals formed by using the rest of the flux-cored wires were kept at 690° C. for 1 hr and cooled by furnace cooling. Tensile test measured 0.2%-offset yield strength and elongation. Acceptance conditions for tensile performances represented by measured values measured by mechanical measurement were specified for the qualities of the plates 1, i.e., qualities of test plates shown in Tables 15 to 23, respectively. Table 14 shows tensile performance acceptance conditions for Examples and Comparative examples. Three No. 4 Charpy test specimens provided with a 2 mm V notch of each weld metal were subjected to Charpy impact test at −18° C. and amounts of energy absorbed by the test specimens were measured, and the impact performance of the weld metal was represented by the average of the three measured values. The range of acceptable impact performance was 55 J or above, which was expressed by: $_{2mm}vE_{-18°C.}$ (Avg.) $\geq$55 J.

Test specimens were treated for a long time by a PWHT using a high temperature and then examined for ferrite band in the weld metals. Test specimens formed by welding plates of a 0.5% Mo steel and a 1.25% Cr-0.5% Mo steel were kept at 690° C. for 9.5 hr and cooled b furnace cooling. Test specimens formed by welding plates of 2.25% Cr-1.0% Mo steel were kept at 690° C. for 15.3 hr and cooled by furnace cooling. The qualities of the test plates 1 (types of steels of the test plates) and the compositions of the shielding gases are shown in Tables 15 to 23 showing test results. Sections for microstructure observation were sampled from six parts of the weld metal at equal intervals along the weld line of the weld metal after PWHT and the sections were polished by mirrorlike finishing and finished by etching to obtain six test specimens for the observation of microstructure. The test specimens were observed by an optical microscope to see if any ferrite bands are formed. It was decided that the ferrite band suppressing abilities of the flux-cored wires were acceptable when any ferrite bands were not found in any one of the six test specimens of each weld metal and that the same were unacceptable when ferrite bands are found in any one of the six test specimens of each weld metal. The weld metals were analyzed to determine the chemical compositions thereof.

(2) Evaluation of Wire Usability

Weld metals were produced by flat-position welding as mentioned in (1) and by fillet welding in a vertical position under conditions shown in Table 13 using the flux-cored wires in Examples 1 to 33 shown in Tables 6 to 11 and the flux-cored wires in Comparative examples 1 to 29 shown in Tables 3 to 6. The usability of the flux-cored wires was evaluated by sensory tests in terms of arc stability during welding, slag removability, spattering intensity and bead shape.

Results of all those tests and the results of evaluation are shown in Tables 1 to 23 below.

Results of the test using the flux-cored wires in examples and comparative examples are explained as follows.

The flux-cored wire in Comparative example 1 has a C content exceeding 0.20% by mass, which is the upper limit C content specified by the present invention. Hot cracking occurred in the weld metal formed by using the flux-cored wire in Comparative example 1, and the weld metal had an excessively high tensile strength and could not meet required impact performance.

The flux-cored wire in Comparative example 2 has a Si content smaller than 0.06% by mass, which is the lower limit Si content specified by the present invention. The weld metal had insufficient viscosity, unacceptable convex beads were formed by vertical-position welding. Blow holes were formed in the weld metal due to insufficient deoxidation. The weld metal had a low toughness due to low B recovery and could not meet the required impact performance. Sufficient TiN that suppresses ferrite band could not be precipitated due to the insufficient reduction of $TiO_2$ and ferrite bands were formed in the weld metal.

The flux-cored wire in Comparative example 3 has a Si content greater than 1.10% by mass, which is the upper limit Si content specified by the present invention. The weld metal had an excessively high tensile strength, and the weld metal could not meet the required impact performance due to the reduction of toughness because of the solid solution of Ti increased due to the excessive reduction of $TiO_2$.

The flux-cored wire in Comparative example 4 has a Mn content smaller than 0.55% by mass, which is the lower limit Mn content specified by the present invention. Although the usability of the flux-cored wire was satisfactory, blow holes were formed in the weld metal due to insufficient deoxidation, and the tensile strength and the 0.2%-offset yield strength and the toughness of the weld metal were low due to insufficient hardening and the small B recovery. The weld metal could not meet required abilities corresponding to those properties. Sufficient TiN that suppresses ferrite band could not be precipitated due to the insufficient reduction of $TiO_2$ and ferrite bands were formed in the weld metal.

The flux-cored wire in Comparative example 5 has a Mn content exceeding 1.60% by mass, which is the upper limit Mn content specified by the present invention. The fluidity of the weld metal was excessively high and unacceptable convex beads were formed by vertical-position welding. The weld metal had an excessively high tensile strength, The solid solution of Ti increased due to the excessive reduction of $TiO_2$. Consequently, the weld metal had a low toughness and could not meet required impact performance.

The flux-cored wire in Comparative example 6 has a Cr content exceeding 2.60% by mass, which is the upper limit Cr content specified by the present invention. The weld metal had an excessively high tensile strength, a low toughness and could not meet required impact performance.

The flux-cored wire in Comparative example 7 has a Mo content smaller than 0.30% by mass, which is a lower limit Mo content specified by the present invention. The weld metal had a low tensile strength and a low 0.2%-offset yield strength, that is, low strength properties.

The flux-cored wire in Comparative example 8 has a Mo content greater than 1.50% by mass, which is the upper limit Mo content specified by the present invention. The weld metal had a low toughness and could not meet the required impact performance.

The flux-cored wires in Comparative examples 9 and 10 have Al contents greater than 0.50% by mass, which is the upper limit Al content specified by the present invention. The weld metals hardened and embrittled, had excessively high tensile strengths and low toughnesses, respectively, and could not meet the required impact performance.

The flux-cored wires in Comparative examples 11 and 12 have Nb contents greater than 0.015% by mass, which is the upper limit Nb content, specified by the present invention. The weld metals had low toughnesses, and could not meet the required impact performance.

The flux-cored wires in Comparative examples 13 and 14 have V contents greater than 0.015% by mass, which is the upper limit V content specified by the present invention. The weld metals had low toughnesses, and could not meet the required impact performance.

The flux-cored wire in Comparative example 15 has a B content smaller than 0.001% by mass, which is the lower limit B content specified by the present invention. The weld metal could not be formed in fined microstructure, had a low toughness and could not meet the required impact performance.

The flux-cored wires in Comparative examples 16 and 17 have B contents greater than 0.020% by mass, which is the upper limit B content specified by the present invention. Hot cracking occurred in the weld metal.

The flux-cored wire in Comparative example 18 had a N content smaller than 0.005% by mass, which is the lower limit N content specified by the present invention. Ti could not be fixated in a TiN precipitate, and the weld metal had a low toughness and could not meet the required impact performance. Sufficient TiN that suppresses ferrite band was not precipitated and ferrite bands were formed in the weld metal.

The flux-cored wire in Comparative example 19 has a N content greater than 0.035% by mass, which is the upper limit N content specified by the present invention. Blow holes were formed in the weld metal, the toughness of the weld metal was reduced due to the increase of the solid solution of N, and the weld metal could not meet the required impact performance.

The flux-cored wire in Comparative example 20 has a Mg content smaller than 0.20% by mass, which is the lower limit Mg content specified by the present invention. Blow holes were formed in the weld metal due to insufficient deoxidation. The B recovery was low, and the weld metal had a low toughness and could not meet the required impact performance. Sufficient TiN that suppresses ferrite band could not be precipitated due to the insufficient reduction of $TiO_2$ and ferrite bands were formed in the weld metal.

The flux-cored wire in Comparative example 21 has a Mg content greater than 1.50% by mass, which is the upper limit Mg content specified by the present invention. Intense spattering occurred during welding. The weld metal has a low toughness due to increase of the solid solution of Ti resulting from the excessive reduction of $TiO_2$, and the weld metal could not meet the required impact performance.

The flux-cored wire in Comparative example 22 has a $TiO_2$ content smaller than 4.2% by mass, which is the lower limit $TiO_2$ content specified by the present invention. Arcs were unstable and the usability of the flux-cored wire was practically unacceptable. Since the $TiO_2$ content is small and the reduction of $TiO_2$ was insufficient, insufficient Ti was produced. Sufficient TiN that suppresses ferrite band was not precipitated and ferrite bands were formed in the weld metal.

The flux-cored wire in Comparative example 23 has a $TiO_2$ content greater than 8.2% by mass, which is the upper limit $TiO_2$ content specified by the present invention. Slag covered the molten pool during welding and slag inclusion occurred. The weld metal had a low toughness due to a large oxygen content, and could not meet the required impact performance.

The flux-cored wire in Comparative example 24 has a fluorine compound content in terms of F content smaller than 0.025% by mass, which is the lower limit fluorine compound content in terms of F content specified by the present invention. Arcs were instable during welding and the usability of the flux-cored wire was practically unacceptable. Blow holes were formed in the weld metal due to insufficient deoxidation. The weld metal had a low toughness due to low B recovery and could not meet the required impact performance. Sufficient TiN that suppresses ferrite band was not precipitated due to insufficient reduction of $TiO_2$ and ferrite bands were formed in the weld metal.

The flux-cored wire in Comparative example 25 has a fluorine compound content in terms of F content greater than 0.55% by mass, which is the upper limit fluorine compound content in terms of F content specified by the present invention. The fluidity of slag was excessively high, the bead covering performance of slag was unsatisfactory, and unacceptable convex beads were formed by vertical-position welding.

The flux-cored wire in Comparative example 26 has a Si content and Mn content smaller than 0.06% by mass and 0.55% by mass, respectively, which are the lower limit Si content and the lower limit Mn content specified by the present invention. The weld metal had insufficient viscosity and unacceptable convex beads were formed by vertical-position welding. The weld metal was insufficiently deoxidized and blow holes were formed in the weld metal. The weld metal had a low toughness due to insufficient B recovery and could not meet the required impact performance. Sufficient TiN that suppresses ferrite band could not be precipitated due to the insufficient reduction of $TiO_2$ and ferrite bands were formed in the weld metal.

The flux-cored wire in Comparative example 27 has a $TiO_2$ content smaller than 4.2% by mass, which is the lower limit $TiO_2$ content specified by the present invention, and a fluorine compound content in terms of F content greater than 0.55% by mass, which is the upper limit fluorine compound content in terms of F content specified by the present invention. Arcs were unstable during welding, the bead covering performance of slag was unsatisfactory, and unacceptable convex beads were formed by vertical-position welding. Sufficient TiN that suppresses ferrite band could not be precipitated due to the insufficient reduction of the small $TiO_2$ content and ferrite bands were formed in the weld metal.

The flux-cored wire in Comparative example 28 has an Al content and N content greater than 0.50% by mass and 0.035% by mass, respectively, which are the upper limit Al content and the upper limit N content specified by the present invention. The removability of slag was unsatisfactory and blow holes were formed in the weld metal. The weld metal hardened due to the excessive Al content and, consequently, the tensile strength was excessively high. The amount of solid solution of N was large due to the excessive N content and, consequently, the weld metal had a low toughness and could not meet the required impact performance.

The flux-cored wire in Comparative example 29 has a B content and N content greater than 0.020% by mass and 0.035% by mass, respectively, which are the upper limit B content and the upper limit N content specified by the present invention. The removability of slag was unsatisfactory and blow holes were formed in the weld metal. The amount of solid solution of N was large due to the excessive N content, the weld metal had a low toughness and could not meet the required impact performance.

The flux-cored wires in Examples 1 to 35 have C, Si, Mn, Cr, Mo, Mg, N and B contents in the ranges specified by the present invention, the fluxes of those flux-cored wires contain $TiO_2$ and the fluorine compound, the $TiO_2$ contents and the fluoride compound contents in terms of F content of those flux-cored wires are in the ranges specified by the present invention, and the Al contents, the Nb contents and the V contents of those flux cored wires are not greater than the upper limits of Al content, Nb content and V content. All the weld metals produced by welding using the flux-cored wires in Examples 1 to 35 were satisfactory in radiant-ray transmitting performance, were excellent in tensile strength and toughness after PWHT, any ferrite bands were not formed at all in those weld metals even after the weld metals had been processed at high temperatures for a long time for PWHT. All the weld metals formed by welding using the flux-cored wires in Examples were acceptable. The flux-cored wires in Examples 1 to 10, Examples 12 to 25 and Examples 29 to 35 contain Ti and/or Zr, the Ti contents and/or the Zr contents of those flux-cored wires are in the content ranges specified by the present invention. Thus, the weld metals produced by welding using those flux-cored wires of the present invention were excellent in toughness, compared with the other Examples. All the flux-cored wires in Examples 1 to 35 excluding the flux-cored wire in Example 5 have Mn contents not greater than 1.45% by mass, which is the upper limit Mn content specified by the present invention, and those flux-cored wires formed beads of very satisfactory shapes by vertical-position welding.

Figure 2:
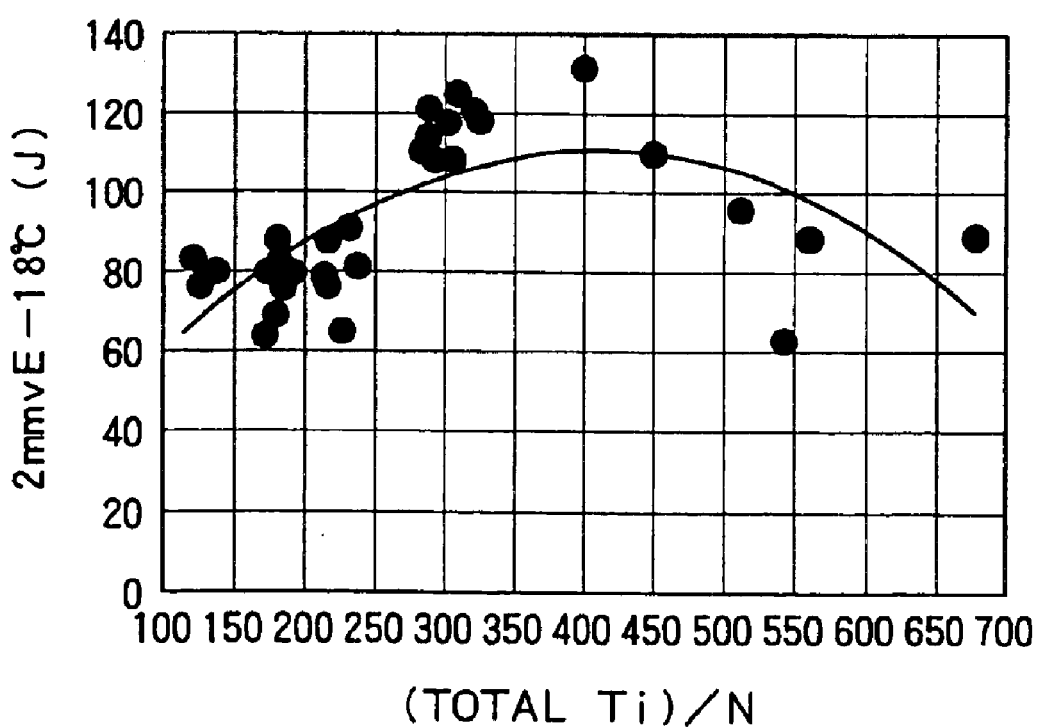
FIG. 2 is a graph showing the dependence of the Charpy impact energies $_{2\ mmv}E_{-18°\ C.}$ (Avg.) of weld metals produced by using flux-cored wires in examples of the present invention on the ratio of total Ti content to N content of examples.

In the flux-cored wires in Examples 1 to 6 and Examples 6, 8, 9, 19, 20, 34 and 35, the ratio of total Ti content to N content are in the range of 250 to 500, and the weld metals produced by welding using those flux-cored wires were superior in toughness to the weld metals produced by welding using the flux-cored wires in other examples as shown in FIG. 2, which is a graph showing the dependence of the Charpy impact energies $_{2\,mmv}E_{-18°\,C.}$ (Avg.) of weld metals on the ratio of total Ti content to N content.

As apparent form the foregoing description, according to the present invention, the formation of ferrite bands in the weld metals is suppressed even if the weld metals are processed at high temperatures for a long time for PWHT, the reduction of tensile strength is prevented, and the weld metals are excellent in toughness. The flux-cored wires of the present invention for the gas-shielded arc welding of work-pieces of heat-resisting low alloy steels are satisfactory in usability not only in flat welding but also in vertical welding and overhead welding.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

TABLE 1

| Name of material | Quality | C | Si | Mn | P | S | Cu | Ni | Cr |
|---|---|---|---|---|---|---|---|---|---|
| | | | | | | | (Unit: Percent by mass) | | |
| Mild steel | A | 0.036 | <0.01 | 0.20 | 0.012 | 0.007 | 0.013 | 0.014 | 0.020 |
| | B | 0.010 | <0.01 | 0.25 | 0.006 | 0.004 | 0.011 | 0.012 | 0.019 |
| Cr—Mo alloy steal | C | 0.025 | 0.50 | 1.14 | 0.003 | 0.007 | 0.012 | 0.084 | 1.39 |
| | D | 0.031 | 0.48 | 1.10 | 0.007 | 0.005 | 0.013 | 0.031 | 2.44 |

TABLE 2

| Name of material | Quality | Mo | Al | Ti | Nb | V | B | N | Mg |
|---|---|---|---|---|---|---|---|---|---|
| | | | | | | | (Unit: Percent by mass) | | |
| Mild steel | A | 0.005 | 0.038 | <0.002 | 0.003 | <0.002 | <0.0002 | 0.0024 | <0.002 |
| | B | 0.002 | 0.008 | <0.002 | 0.003 | <0.002 | <0.0002 | 0.0033 | <0.002 |
| Cr—Mo alloy steal | C | 0.48 | 0.004 | 0.002 | 0.003 | 0.003 | <0.0002 | 0.0080 | <0.002 |
| | D | 1.10 | 0.002 | <0.002 | 0.003 | 0.004 | <0.0002 | 0.0090 | <0.002 |

TABLE 3

| | | Wire No. | | | | | | | |
|---|---|---|---|---|---|---|---|---|---|
| | | Comparative example 1 | Comparative example 2 | Comparative example 3 | Comparative example 4 | Comparative example 5 | Comparative example 6 | Comparative example 7 | Comparative example 8 |
| Sheath quality | | B | B | B | B | B | B | B | B |
| Flux ratio (% by mass) | | 17.0 | 17.0 | 17.0 | 14.0 | 14.0 | 16.0 | 16.0 | 16.0 |
| Slag-forming material content | | 8.228 | 8.228 | 8.228 | 6.776 | 6.776 | 7.696 | 7.744 | 7.760 |
| | | Composition (% by mass) | | | | | | | |
| C | | 0.218 | 0.039 | 0.040 | 0.038 | 0.055 | 0.042 | 0.042 | 0.037 |
| Si | | 0.664 | 0.051 | 1.415 | 0.537 | 0.566 | 0.615 | 0.593 | 0.424 |
| Mn | | 1.451 | 1.381 | 1.387 | 0.541 | 1.623 | 1.369 | 1.373 | 1.364 |
| P | | 0.007 | 0.007 | 0.007 | 0.007 | 0.007 | 0.007 | 0.007 | 0.007 |
| S | | 0.005 | 0.005 | 0.005 | 0.005 | 0.005 | 0.005 | 0.005 | 0.005 |
| Cu | | 0.009 | 0.010 | 0.009 | 0.010 | 0.010 | 0.009 | 0.010 | 0.009 |
| Ni | | 0.010 | 0.010 | 0.010 | 0.010 | 0.010 | 0.010 | 0.010 | 0.010 |
| Cr | | 1.525 | 1.322 | 1.325 | 1.267 | 1.267 | 2.659 | 1.306 | 2.396 |
| Mo | | 0.503 | 0.502 | 0.502 | 0.413 | 0.413 | 0.953 | 0.292 | 1.524 |
| Al | Al (Sheath, alloy powder) | 0.011 | 0.007 | 0.033 | 0.011 | 0.011 | 0.011 | 0.011 | 0.011 |
| | $Al_2O_3$ (Equivalent Al content) | 0.045 | 0.045 | 0.045 | 0.037 | 0.037 | 0.028 | 0.043 | 0.042 |
| | Total | 0.056 | 0.052 | 0.078 | 0.048 | 0.048 | 0.039 | 0.054 | 0.053 |
| Ti | | 0.001 | 0.001 | 0.003 | 0.001 | 0.001 | 0.001 | 0.001 | 0.001 |

TABLE 3-continued

| | | Wire No. | | | | | | | |
|---|---|---|---|---|---|---|---|---|---|
| | | Comparative example 1 | Comparative example 2 | Comparative example 3 | Comparative example 4 | Comparative example 5 | Comparative example 6 | Comparative example 7 | Comparative example 8 |
| Nb | Nb (Sheath, alloy powder) | 0.002 | 0.002 | 0.002 | 0.002 | 0.002 | 0.002 | 0.002 | 0.002 |
| | $Nb_2O_3$ (Equivalent Nb content) | 0.000 | 0.000 | 0.000 | 0.000 | 0.000 | 0.000 | 0.000 | 0.000 |
| | Total | 0.002 | 0.002 | 0.002 | 0.002 | 0.002 | 0.002 | 0.002 | 0.002 |
| V | V (Sheath, alloy powder) | 0.001 | 0.001 | 0.001 | 0.001 | 0.001 | 0.001 | 0.001 | 0.001 |
| | $V_2O_3$ (Equivalent V content) | 0.004 | 0.004 | 0.004 | 0.003 | 0.003 | 0.003 | 0.003 | 0.003 |
| | Total | 0.005 | 0.005 | 0.005 | 0.004 | 0.004 | 0.004 | 0.004 | 0.004 |
| B | B (Sheath, alloy powder) | 0.000 | 0.000 | 0.000 | 0.000 | 0.000 | 0.000 | 0.000 | 0.000 |
| | $B_2O_3$ (Equivalent B content) | 0.008 | 0.008 | 0.008 | 0.007 | 0.007 | 0.008 | 0.008 | 0.007 |
| | Total | 0.008 | 0.008 | 0.008 | 0.007 | 0.007 | 0.008 | 0.008 | 0.007 |
| N | | 0.014 | 0.015 | 0.015 | 0.013 | 0.013 | 0.014 | 0.014 | 0.014 |
| Mg | | 0.798 | 0.798 | 0.798 | 0.657 | 0.657 | 0.751 | 0.751 | 0.639 |
| Zr | | 0.000 | 0.000 | 0.000 | 0.000 | 0.000 | 0.000 | 0.000 | 0.000 |
| Slag-forming material | | | | | | | | | |
| $TiO_2$ | | 7.320 | 7.320 | 7.320 | 6.028 | 6.028 | 6.889 | 6.889 | 6.889 |
| $SiO_2$ | | 0.386 | 0.386 | 0.386 | 0.318 | 0.318 | 0.255 | 0.363 | 0.360 |
| $Al_2O_3$ | | 0.085 | 0.085 | 0.085 | 0.070 | 0.070 | 0.052 | 0.080 | 0.080 |
| $ZrO_2$ | | 0.000 | 0.000 | 0.000 | 0.000 | 0.000 | 0.000 | 0.000 | 0.011 |
| MgO | | 0.000 | 0.000 | 0.000 | 0.000 | 0.000 | 0.156 | 0.000 | 0.000 |
| $V_2O_6$ | | 0.007 | 0.007 | 0.007 | 0.005 | 0.005 | 0.006 | 0.006 | 0.006 |
| $Nb_2O_5$ | | 0.000 | 0.000 | 0.000 | 0.000 | 0.000 | 0.000 | 0.000 | 0.000 |
| $Na_2O$ | | 0.050 | 0.050 | 0.050 | 0.041 | 0.041 | 0.042 | 0.047 | 0.044 |
| $K_2O$ | | 0.039 | 0.039 | 0.039 | 0.032 | 0.032 | 0.024 | 0.037 | 0.037 |
| CaO | | 0.000 | 0.000 | 0.000 | 0.000 | 0.000 | 0.002 | 0.000 | 0.000 |
| $B_2O_3$ | | 0.027 | 0.027 | 0.027 | 0.022 | 0.022 | 0.026 | 0.026 | 0.023 |
| Fluoride compound | | | | | | | | | |
| NaF | | 0.000 | 0.000 | 0.000 | 0.000 | 0.000 | 0.075 | 0.000 | 0.045 |
| $K_2SiF_6$ | | 0.304 | 0.304 | 0.304 | 0.250 | 0.250 | 0.080 | 0.286 | 0.159 |
| $CeF_3$ | | 0.000 | 0.000 | 0.000 | 0.000 | 0.000 | 0.066 | 0.000 | 0.086 |
| $CaF_2$ | | 0.000 | 0.000 | 0.000 | 0.000 | 0.000 | 0.000 | 0.000 | 0.016 |
| Total (Equivalent content) | | 0.157 | 0.157 | 0.157 | 0.130 | 0.130 | 0.094 | 0.148 | 0.130 |
| Other elements | | 0.009 | 0.009 | 0.009 | 0.008 | 0.008 | 0.023 | 0.009 | 0.024 |
| Total Ti/N | | 313 | 287 | 290 | 276 | 277 | 287 | 285 | 287 |

TABLE 4

| | Wire No. | | | | | | |
|---|---|---|---|---|---|---|---|
| | Comparative example 9 | Comparative example 10 | Comparative example 11 | Comparative example 12 | Comparative example 13 | Comparative example 14 | Comparative example 15 |
| Sheath quality | B | B | B | B | B | B | B |
| Flux ratio (% by mass) | 18.0 | 18.0 | 15.0 | 15.0 | 15.0 | 15.0 | 13.0 |
| Slag-forming material content | 8.334 | 8.712 | 6.795 | 7.245 | 6.795 | 6.485 | 7.072 |
| Composition (% by mass) | | | | | | | |
| C | 0.046 | 0.051 | 0.044 | 0.044 | 0.044 | 0.044 | 0.040 |
| Si | 0.670 | 0.459 | 0.383 | 0.383 | 0.383 | 0.383 | 0.329 |
| Mn | 0.975 | 1.520 | 1.310 | 1.309 | 1.310 | 1.311 | 1.204 |
| P | 0.007 | 0.007 | 0.007 | 0.007 | 0.007 | 0.008 | 0.007 |
| S | 0.005 | 0.005 | 0.005 | 0.005 | 0.005 | 0.005 | 0.004 |
| Cu | 0.010 | 0.009 | 0.010 | 0.010 | 0.010 | 0.010 | 0.010 |
| Ni | 0.010 | 0.010 | 0.010 | 0.010 | 0.010 | 0.010 | 0.010 |
| Cr | 1.568 | 1.623 | 1.356 | 1.356 | 1.356 | 1.356 | 1.157 |
| Mo | 0.566 | 0.531 | 0.443 | 0.443 | 0.443 | 0.443 | 0.384 |

TABLE 4-continued

| | | Wire No. | | | | | | |
|---|---|---|---|---|---|---|---|---|
| | | Comparative example 9 | Comparative example 10 | Comparative example 11 | Comparative example 12 | Comparative example 13 | Comparative example 14 | Comparative example 15 |
| Al | Al (Sheath, alloy powder) | 0.020 | 0.465 | 0.007 | 0.007 | 0.007 | 0.007 | 0.007 |
| | $Al_2O_3$ (Equivalent Al content) | 0.490 | 0.048 | 0.040 | 0.047 | 0.040 | 0.039 | 0.033 |
| | Total | 0.510 | 0.513 | 0.047 | 0.054 | 0.047 | 0.046 | 0.040 |
| Ti | | 0.001 | 0.001 | 0.001 | 0.001 | 0.001 | 0.001 | 0.001 |
| Nb | Nb (Sheath, alloy powder) | 0.002 | 0.002 | 0.016 | 0.009 | 0.002 | 0.002 | 0.002 |
| | $Nb_2O_3$ (Equivalent Nb content) | 0.000 | 0.000 | 0.001 | 0.008 | 0.001 | 0.010 | 0.000 |
| | Total | 0.002 | 0.002 | 0.017 | 0.017 | 0.003 | 0.012 | 0.002 |
| V | V (Sheath, alloy powder) | 0.001 | 0.001 | 0.001 | 0.001 | 0.013 | 0.001 | 0.001 |
| | $V_2O_3$ (Equivalent V content) | 0.003 | 0.004 | 0.005 | 0.012 | 0.005 | 0.015 | 0.003 |
| | Total | 0.004 | 0.005 | 0.006 | 0.013 | 0.018 | 0.016 | 0.004 |
| B | B (Sheath, alloy powder) | 0.000 | 0.000 | 0.000 | 0.000 | 0.000 | 0.000 | 0.000 |
| | $B_2O_3$ (Equivalent B content) | 0.009 | 0.009 | 0.007 | 0.007 | 0.007 | 0.007 | 0.000 |
| | Total | 0.009 | 0.009 | 0.007 | 0.007 | 0.007 | 0.007 | 0.000 |
| N | | 0.016 | 0.016 | 0.014 | 0.014 | 0.014 | 0.014 | 0.010 |
| Mg | | 0.845 | 0.845 | 0.704 | 0.580 | 0.704 | 0.704 | 1.169 |
| Zr | | 0.000 | 0.000 | 0.000 | 0.000 | 0.000 | 0.000 | 0.000 |
| Slag-forming material | | | | | | | | |
| $TiO_2$ | | 6.474 | 7.750 | 5.967 | 5.083 | 5.967 | 5.489 | 6.494 |
| $SiO_2$ | | 0.457 | 0.409 | 0.849 | 1.558 | 0.349 | 0.401 | 0.234 |
| $Al_2O_3$ | | 0.927 | 0.090 | 0.075 | 0.088 | 0.075 | 0.073 | 0.062 |
| $ZrO_2$ | | 0.000 | 0.000 | 0.000 | 0.000 | 0.000 | 0.000 | 0.000 |
| MgO | | 0.000 | 0.000 | 0.000 | 0.000 | 0.000 | 0.000 | 0.000 |
| $V_2O_6$ | | 0.006 | 0.007 | 0.008 | 0.021 | 0.008 | 0.026 | 0.006 |
| $Nb_2O_5$ | | 0.000 | 0.000 | 0.002 | 0.011 | 0.002 | 0.014 | 0.000 |
| $Na_2O$ | | 0.059 | 0.053 | 0.044 | 0.044 | 0.044 | 0.044 | 0.012 |
| $K_2O$ | | 0.047 | 0.041 | 0.035 | 0.036 | 0.035 | 0.035 | 0.028 |
| CaO | | 0.000 | 0.000 | 0.000 | 0.000 | 0.000 | 0.000 | 0.000 |
| $B_2O_3$ | | 0.029 | 0.029 | 0.024 | 0.024 | 0.024 | 0.024 | 0.000 |
| Fluoride compound | | | | | | | | |
| NaF | | 0.000 | 0.000 | 0.000 | 0.000 | 0.000 | 0.000 | 0.000 |
| $K_2SiF_6$ | | 0.322 | 0.322 | 0.268 | 0.268 | 0.268 | 0.268 | 0.233 |
| $CeF_3$ | | 0.000 | 0.000 | 0.000 | 0.000 | 0.000 | 0.000 | 0.000 |
| $CaF_2$ | | 0.000 | 0.000 | 0.000 | 0.000 | 0.000 | 0.000 | 0.000 |
| Total (Equivalent content) | | 0.167 | 0.167 | 0.139 | 0.139 | 0.139 | 0.139 | 0.120 |
| Other elements | | 0.013 | 0.010 | 0.023 | 0.112 | 0.023 | 0.119 | 0.004 |
| Total Ti/N | | 244 | 293 | 259 | 221 | 259 | 238 | 399 |

TABLE 5

| | Wire No. | | | | | | |
|---|---|---|---|---|---|---|---|
| | Comparative example 16 | Comparative example 17 | Comparative example 18 | Comparative example 19 | Comparative example 20 | Comparative example 21 | Comparative example 22 |
| Sheath quality | B | B | B | B | B | B | B |
| Flux ratio (% by mass) | 13.0 | 13.0 | 13.0 | 13.0 | 15.0 | 15.5 | 14.0 |
| Slag-forming material content (% by mass) | 7.452 | 7.085 | 7.189 | 7.267 | 7.260 | 7.502 | 7.685 |
| Composition (% by mass) | | | | | | | |
| C | 0.040 | 0.040 | 0.039 | 0.040 | 0.044 | 0.045 | 0.042 |
| Si | 0.329 | 0.329 | 0.321 | 0.362 | 0.383 | 0.394 | 0.359 |
| Mn | 1.203 | 1.204 | 1.166 | 1.165 | 1.056 | 1.080 | 1.236 |
| P | 0.007 | 0.007 | 0.007 | 0.007 | 0.007 | 0.007 | 0.007 |
| S | 0.004 | 0.004 | 0.005 | 0.005 | 0.005 | 0.005 | 0.005 |
| Cu | 0.010 | 0.010 | 0.010 | 0.010 | 0.010 | 0.010 | 0.010 |

TABLE 5-continued

|  |  | Wire No. | | | | | | |
| --- | --- | --- | --- | --- | --- | --- | --- | --- |
|  |  | Comparative example 16 | Comparative example 17 | Comparative example 18 | Comparative example 19 | Comparative example 20 | Comparative example 21 | Comparative example 22 |
| Ni |  | 0.010 | 0.010 | 0.010 | 0.010 | 0.010 | 0.010 | 0.010 |
| Cr |  | 1.157 | 1.157 | 1.102 | 1.377 | 1.356 | 1.392 | 1.281 |
| Mo |  | 0.384 | 0.384 | 0.384 | 0.384 | 0.443 | 0.457 | 0.413 |
| Al | Al (Sheath, alloy powder) | 0.007 | 0.010 | 0.007 | 0.007 | 0.007 | 0.007 | 0.007 |
|  | $Al_2O_3$ (Equivalent Al content) | 0.039 | 0.033 | 0.035 | 0.035 | 0.040 | 0.041 | 0.294 |
|  | Total | 0.045 | 0.043 | 0.042 | 0.042 | 0.047 | 0.048 | 0.301 |
| Ti |  | 0.001 | 0.001 | 0.001 | 0.001 | 0.001 | 0.001 | 0.001 |
| Nb | Nb (Sheath, alloy powder) | 0.002 | 0.002 | 0.002 | 0.002 | 0.002 | 0.002 | 0.002 |
|  | $Nb_2O_3$ (Equivalent Nb content) | 0.000 | 0.000 | 0.000 | 0.000 | 0.000 | 0.000 | 0.000 |
|  | Total | 0.002 | 0.002 | 0.002 | 0.002 | 0.002 | 0.002 | 0.002 |
| V | V (Sheath, alloy powder) | 0.001 | 0.001 | 0.001 | 0.001 | 0.001 | 0.001 | 0.001 |
|  | $V_2O_3$ (Equivalent V content) | 0.003 | 0.003 | 0.003 | 0.003 | 0.003 | 0.003 | 0.002 |
|  | Total | 0.004 | 0.004 | 0.004 | 0.004 | 0.004 | 0.004 | 0.003 |
| B | B (Sheath, alloy powder) | 0.000 | 0.022 | 0.000 | 0.000 | 0.000 | 0.000 | 0.000 |
|  | $B_2O_3$ (Equivalent B content) | 0.022 | 0.001 | 0.005 | 0.006 | 0.007 | 0.008 | 0.008 |
|  | Total | 0.022 | 0.023 | 0.006 | 0.006 | 0.007 | 0.008 | 0.008 |
| N |  | 0.010 | 0.010 | 0.003 | 0.037 | 0.014 | 0.013 | 0.016 |
| Mg |  | 1.189 | 1.156 | 0.519 | 0.519 | 0.180 | 1.517 | 0.657 |
| Zr |  | 0.000 | 0.000 | 0.000 | 0.000 | 0.000 | 0.000 | 0.000 |
| Slag-forming material |  |  |  |  |  |  |  |  |
| $TiO_2$ |  | 6.494 | 6.494 | 6.494 | 6.494 | 6.459 | 6.674 | 4.126 |
| $SiO_2$ |  | 0.439 | 0.241 | 0.296 | 0.296 | 0.341 | 0.352 | 2.258 |
| $Al_2O_3$ |  | 0.074 | 0.062 | 0.066 | 0.066 | 0.075 | 0.078 | 0.556 |
| $ZrO_2$ |  | 0.000 | 0.000 | 0.000 | 0.000 | 0.000 | 0.000 | 0.000 |
| MgO |  | 0.000 | 0.000 | 0.000 | 0.000 | 0.000 | 0.000 | 0.000 |
| $V_2O_6$ |  | 0.008 | 0.006 | 0.006 | 0.006 | 0.006 | 0.006 | 0.004 |
| $Nb_2O_5$ |  | 0.000 | 0.000 | 0.000 | 0.000 | 0.000 | 0.000 | 0.000 |
| $Na_2O$ |  | 0.101 | 0.015 | 0.039 | 0.039 | 0.044 | 0.046 | 0.287 |
| $K_2O$ |  | 0.035 | 0.028 | 0.030 | 0.030 | 0.035 | 0.036 | 0.198 |
| CaO |  | 0.000 | 0.000 | 0.000 | 0.000 | 0.000 | 0.000 | 0.000 |
| $B_2O_3$ |  | 0.069 | 0.002 | 0.021 | 0.021 | 0.024 | 0.025 | 0.025 |
| Fluoride compound |  |  |  |  |  |  |  |  |
| NaF |  | 0.000 | 0.000 | 0.000 | 0.000 | 0.000 | 0.000 | 0.000 |
| $K_2SiF_6$ |  | 0.233 | 0.233 | 0.233 | 0.233 | 0.268 | 0.277 | 0.250 |
| $CeF_3$ |  | 0.000 | 0.000 | 0.000 | 0.032 | 0.000 | 0.000 | 0.000 |
| $CaF_2$ |  | 0.000 | 0.000 | 0.000 | 0.038 | 0.000 | 0.000 | 0.000 |
| Total (Equivalent content) |  | 0.120 | 0.120 | 0.120 | 0.148 | 0.139 | 0.144 | 0.130 |
| Other elements |  | 0.012 | 0.004 | 0.006 | 0.013 | 0.008 | 0.006 | 0.082 |
| Total Ti/N |  | 400 | 399 | 1326 | 105 | 280 | 306 | 166 |

TABLE 6

| | | Wire No. | | | | | | |
|---|---|---|---|---|---|---|---|---|
| | | Comparative example 23 | Comparative example 24 | Comparative example 25 | Comparative example 26 | Comparative example 27 | Comparative example 28 | Comparative example 29 |
| Sheath quality | | B | B | B | B | B | B | B |
| Flux ratio (% by mass) | | 14.0 | 13.0 | 16.0 | 16.0 | 14.0 | 18.0 | 14.0 |
| Slag-forming material content (% by mass) | | 9.002 | 7.644 | 8.848 | 7.744 | 6.874 | 8.694 | 8.035 |
| | | Composition (% by mass) | | | | | | |
| C | | 0.034 | 0.040 | 0.046 | 0.047 | 0.042 | 0.047 | 0.041 |
| Si | | 0.367 | 0.332 | 0.395 | 0.049 | 0.360 | 0.325 | 0.343 |
| Mn | | 1.230 | 1.165 | 1.266 | 0.502 | 1.140 | 1.033 | 1.275 |
| P | | 0.006 | 0.007 | 0.007 | 0.006 | 0.007 | 0.007 | 0.007 |
| S | | 0.005 | 0.004 | 0.005 | 0.005 | 0.005 | 0.005 | 0.004 |
| Cu | | 0.010 | 0.010 | 0.010 | 0.010 | 0.010 | 0.010 | 0.010 |
| Ni | | 0.010 | 0.010 | 0.010 | 0.010 | 0.010 | 0.010 | 0.010 |
| Cr | | 1.356 | 1.178 | 1.396 | 1.378 | 1.281 | 1.153 | 1.292 |
| Mo | | 0.413 | 0.384 | 0.472 | 0.472 | 0.413 | 0.531 | 0.413 |
| Al | Al (Sheath, alloy powder) | 0.013 | 0.007 | 0.007 | 0.007 | 0.007 | 0.465 | 0.007 |
| | $Al_2O_3$ (Equivalent Al content) | 0.029 | 0.035 | 0.042 | 0.043 | 0.132 | 0.048 | 0.042 |
| | Total | 0.042 | 0.042 | 0.049 | 0.050 | 0.139 | 0.513 | 0.049 |
| Ti | | 0.001 | 0.001 | 0.001 | 0.001 | 0.001 | 0.001 | 0.001 |
| Nb | Nb (Sheath, alloy powder) | 0.002 | 0.002 | 0.002 | 0.002 | 0.002 | 0.002 | 0.002 |
| | $Nb_2O_3$ (Equivalent Nb content) | 0.000 | 0.000 | 0.000 | 0.000 | 0.000 | 0.000 | 0.000 |
| | Total | 0.002 | 0.002 | 0.002 | 0.002 | 0.002 | 0.002 | 0.002 |
| V | V (Sheath, alloy powder) | 0.001 | 0.001 | 0.001 | 0.001 | 0.001 | 0.001 | 0.001 |
| | $V_2O_3$ (Equivalent V content) | 0.004 | 0.004 | 0.004 | 0.003 | 0.002 | 0.004 | 0.004 |
| | Total | 0.005 | 0.005 | 0.005 | 0.004 | 0.003 | 0.005 | 0.005 |
| B | B (Sheath, alloy powder) | 0.000 | 0.000 | 0.000 | 0.000 | 0.000 | 0.000 | 0.000 |
| | $B_2O_3$ (Equivalent B content) | 0.008 | 0.006 | 0.007 | 0.008 | 0.008 | 0.008 | 0.023 |
| | Total | 0.008 | 0.008 | 0.007 | 0.008 | 0.008 | 0.008 | 0.023 |
| N | | 0.013 | 0.012 | 0.014 | 0.014 | 0.015 | 0.038 | 0.038 |
| Mg | | 0.559 | 0.610 | 0.639 | 0.799 | 0.657 | 0.845 | 1.259 |
| Zr | | 0.000 | 0.000 | 0.000 | 0.000 | 0.000 | 0.000 | 0.000 |
| Slag-forming material | | | | | | | | |
| $TiO_2$ | | 8.322 | 7.143 | 7.193 | 6.889 | 4.126 | 7.750 | 6.993 |
| $SiO_2$ | | 0.271 | 0.289 | 0.355 | 0.363 | 1.042 | 0.399 | 0.473 |
| $Al_2O_3$ | | 0.055 | 0.065 | 0.080 | 0.080 | 0.249 | 0.090 | 0.079 |
| $ZrO_2$ | | 0.000 | 0.000 | 0.000 | 0.000 | 0.000 | 0.000 | 0.000 |
| MgO | | 0.000 | 0.000 | 0.000 | 0.000 | 0.000 | 0.000 | 0.000 |
| $V_2O_6$ | | 0.007 | 0.006 | 0.006 | 0.005 | 0.004 | 0.007 | 0.006 |
| $Nb_2O_5$ | | 0.000 | 0.000 | 0.000 | 0.000 | 0.000 | 0.000 | 0.000 |
| $Na_2O$ | | 0.046 | 0.036 | 0.044 | 0.047 | 0.103 | 0.049 | 0.109 |
| $K_2O$ | | 0.019 | 0.030 | 0.037 | 0.037 | 0.085 | 0.041 | 0.038 |
| CaO | | 0.000 | 0.000 | 0.000 | 0.000 | 0.000 | 0.000 | 0.000 |
| $B_2O_3$ | | 0.025 | 0.019 | 0.023 | 0.026 | 0.025 | 0.026 | 0.075 |
| Fluoride compound | | | | | | | | |
| NaF | | 0.000 | 0.000 | 0.000 | 0.000 | 0.606 | 0.000 | 0.000 |
| $K_2SiF_6$ | | 0.250 | 0.039 | 1.097 | 0.286 | 0.557 | 0.322 | 0.250 |
| $CeF_3$ | | 0.000 | 0.011 | 0.000 | 0.000 | 0.000 | 0.000 | 0.000 |
| $CaF_2$ | | 0.000 | 0.000 | 0.000 | 0.000 | 0.000 | 0.000 | 0.000 |
| Total (Equivalent content) | | 0.130 | 0.023 | 0.568 | 0.148 | 0.562 | 0.167 | 0.130 |
| Other elements | | 0.006 | 0.007 | 0.013 | 0.009 | 0.078 | 0.009 | 0.013 |
| Total Ti/N | | 384 | 348 | 298 | 305 | 166 | 121 | 111 |

TABLE 7

| | Wire No. | | | | | | |
|---|---|---|---|---|---|---|---|
| | Example 1 | Example 2 | Example 3 | Example 4 | Example 5 | Example 6 | Example 7 |
| Sheath quality | A | B | B | B | B | B | B |
| Flux ratio (% by mass) | 15.0 | 15.0 | 15.0 | 18.0 | 18.0 | 13.0 | 14.0 |
| Slag-forming material content (% by mass) | 7.260 | 7.280 | 7.245 | 8.910 | 8.910 | 6.565 | 7.140 |
| Composition (% by mass) | | | | | | | |
| C | 0.170 | 0.035 | 0.037 | 0.044 | 0.043 | 0.035 | 0.036 |
| Si | 0.487 | 0.073 | 0.841 | 0.417 | 0.271 | 0.357 | 0.379 |
| Mn | 0.640 | 1.217 | 0.817 | 0.559 | 1.573 | 1.008 | 1.074 |
| P | 0.012 | 0.008 | 0.007 | 0.007 | 0.007 | 0.007 | 0.006 |
| S | 0.007 | 0.006 | 0.005 | 0.005 | 0.006 | 0.005 | 0.005 |
| Cu | 0.011 | 0.010 | 0.010 | 0.010 | 0.010 | 0.010 | 0.010 |
| Ni | 0.012 | 0.010 | 0.010 | 0.010 | 0.010 | 0.010 | 0.010 |
| Cr | 1.125 | 1.293 | 1.294 | 1.548 | 1.548 | 2.524 | 0.113 |
| Mo | 0.380 | 0.443 | 0.443 | 0.531 | 0.531 | 0.978 | 0.466 |
| Al — Al | 0.033 | 0.007 | 0.022 | 0.007 | 0.007 | 0.008 | 0.007 |
| Al — $Al_2O_3$ (Equivalent Al content) | 0.040 | 0.040 | 0.040 | 0.048 | 0.048 | 0.035 | 0.038 |
| Al — Total | 0.073 | 0.047 | 0.062 | 0.035 | 0.055 | 0.043 | 0.045 |
| Ti | 0.001 | 0.001 | 0.002 | 0.001 | 0.001 | 0.001 | 0.001 |
| Nb — Nb | 0.002 | 0.002 | 0.002 | 0.002 | 0.002 | 0.002 | 0.002 |
| Nb — $Nb_2O_3$ (Equivalent Nb content) | 0.000 | 0.000 | 0.000 | 0.000 | 0.000 | 0.000 | 0.000 |
| Nb — Total | 0.002 | 0.002 | 0.002 | 0.002 | 0.002 | 0.002 | 0.002 |
| V — V | 0.001 | 0.001 | 0.001 | 0.001 | 0.001 | 0.001 | 0.001 |
| V — $V_2O_3$ (Equivalent V content) | 0.008 | 0.003 | 0.003 | 0.004 | 0.004 | 0.003 | 0.003 |
| V — Total | 0.004 | 0.004 | 0.004 | 0.005 | 0.005 | 0.004 | 0.004 |
| B — B | 0.000 | 0.000 | 0.000 | 0.000 | 0.000 | 0.000 | 0.000 |
| B — $B_2O_3$ (Equivalent B content) | 0.007 | 0.007 | 0.007 | 0.009 | 0.009 | 0.007 | 0.007 |
| B — Total | 0.007 | 0.007 | 0.007 | 0.009 | 0.009 | 0.007 | 0.007 |
| N | 0.012 | 0.013 | 0.013 | 0.015 | 0.015 | 0.011 | 0.015 |
| Mg | 0.599 | 0.599 | 0.599 | 0.719 | 0.719 | 0.519 | 0.559 |
| Zr | 0.109 | 0.033 | 0.033 | 0.261 | 0.163 | 0.118 | 0.127 |
| Slag-forming material | | | | | | | |
| $TiO_2$ | 6.459 | 6.459 | 5.994 | 7.553 | 7.553 | 5.455 | 5.874 |
| $SiO_2$ | 0.341 | 0.341 | 0.341 | 0.467 | 0.487 | 0.301 | 0.324 |
| $Al_2O_3$ | 0.075 | 0.075 | 0.075 | 0.090 | 0.090 | 0.066 | 0.071 |
| $ZrO_2$ | 0.000 | 0.000 | 0.000 | 0.299 | 0.299 | 0.129 | 0.139 |
| MgO | 0.000 | 0.000 | 0.000 | 0.000 | 0.000 | 0.250 | 0.269 |
| $V_2O_6$ | 0.005 | 0.006 | 0.005 | 0.007 | 0.007 | 0.005 | 0.005 |
| $Nb_2O_5$ | 0.000 | 0.000 | 0.000 | 0.000 | 0.000 | 0.000 | 0.000 |
| $Na_2O$ | 0.044 | 0.044 | 0.044 | 0.053 | 0.053 | 0.039 | 0.041 |
| $K_2O$ | 0.035 | 0.035 | 0.035 | 0.041 | 0.041 | 0.030 | 0.032 |
| CaO | 0.000 | 0.000 | 0.000 | 0.000 | 0.000 | 0.003 | 0.003 |
| $B_2O_3$ | 0.024 | 0.024 | 0.024 | 0.029 | 0.029 | 0.022 | 0.023 |
| Fluoride compound | | | | | | | |
| NaF | 0.000 | 0.000 | 0.141 | 0.169 | 0.169 | 0.122 | 0.132 |
| $K_2SiF_6$ | 0.268 | 0.268 | 0.119 | 0.143 | 0.143 | 0.103 | 0.111 |
| $CeF_3$ | 0.000 | 0.000 | 0.374 | 0.000 | 0.000 | 0.000 | 0.058 |
| $CaF_2$ | 0.000 | 0.000 | 0.000 | 0.035 | 0.035 | 0.025 | 0.027 |
| Total (Equivalent content) | 0.139 | 0.139 | 0.234 | 0.168 | 0.168 | 0.121 | 0.147 |
| Other elements | 0.008 | 0.008 | 0.093 | 0.022 | 0.022 | 0.016 | 0.029 |
| Total Ti/N | 320 | 301 | 281 | 306 | 307 | 286 | 234 |

TABLE 8

| | Wire No. | | | | | | |
|---|---|---|---|---|---|---|---|
| | Example 8 | Example 9 | Example 10 | Example 11 | Example 12 | Example 13 | Example 14 |
| Sheath quality | A | B | B | B | B | B | B |
| Flux ratio (% by mass) | 17.0 | 16.0 | 18.0 | 13.0 | 15.5 | 15.5 | 15.5 |
| Slag-forming material content (% by mass) | 8.636 | 8.272 | 8.388 | 7.111 | 7.549 | 7.564 | 7.564 |
| Composition (% by mass) | | | | | | | |
| C | 0.064 | 0.048 | 0.047 | 0.040 | 0.045 | 0.045 | 0.046 |
| Si | 0.462 | 0.624 | 0.536 | 0.404 | 0.526 | 0.393 | 0.532 |
| Mn | 1.202 | 1.379 | 1.379 | 1.077 | 1.343 | 1.228 | 1.228 |
| P | 0.011 | 0.007 | 0.007 | 0.007 | 0.007 | 0.007 | 0.007 |
| S | 0.008 | 0.005 | 0.006 | 0.005 | 0.005 | 0.005 | 0.005 |
| Cu | 0.011 | 0.010 | 0.010 | 0.010 | 0.010 | 0.010 | 0.010 |
| Ni | 0.012 | 0.010 | 0.010 | 0.010 | 0.010 | 0.010 | 0.010 |
| Cr | 2.482 | 1.445 | 1.278 | 1.158 | 1.280 | 1.214 | 1.354 |
| Mo | 1.068 | 0.472 | 0.472 | 0.408 | 0.457 | 0.457 | 0.457 |
| Al | Al | 0.032 | 0.167 | 0.007 | 0.007 | 0.008 | 0.007 | 0.007 |
| | $Al_2O_3$ (Equivalent Al content) | 0.046 | 0.295 | 0.043 | 0.033 | 0.041 | 0.041 | 0.041 |
| | Total | 0.078 | 0.462 | 0.050 | 0.041 | 0.049 | 0.050 | 0.048 |
| Ti | | 0.072 | 0.068 | 0.068 | 0.001 | 0.286 | 0.066 | 0.066 |
| Nb | Nb | 0.002 | 0.002 | 0.003 | 0.002 | 0.002 | 0.002 | 0.002 |
| | $Nb_2O_3$ (Equivalent Nb content) | 0.000 | 0.000 | 0.003 | 0.000 | 0.000 | 0.000 | 0.000 |
| | Total | 0.002 | 0.002 | 0.006 | 0.002 | 0.002 | 0.002 | 0.002 |
| V | V | 0.001 | 0.001 | 0.001 | 0.001 | 0.001 | 0.001 | 0.001 |
| | $V_2O_3$ (Equivalent V content) | 0.004 | 0.003 | 0.007 | 0.003 | 0.003 | 0.003 | 0.003 |
| | Total | 0.005 | 0.004 | 0.008 | 0.004 | 0.004 | 0.004 | 0.004 |
| B | B | 0.000 | 0.000 | 0.000 | 0.000 | 0.000 | 0.000 | 0.000 |
| | $B_2O_3$ (Equivalent B content) | 0.009 | 0.008 | 0.008 | 0.002 | 0.008 | 0.009 | 0.009 |
| | Total | 0.009 | 0.008 | 0.008 | 0.002 | 0.018 | 0.009 | 0.009 |
| N | | 0.013 | 0.014 | 0.019 | 0.007 | 0.023 | 0.006 | 0.033 |
| Mg | | 0.849 | 0.751 | 0.751 | 0.234 | 0.728 | 0.728 | 0.728 |
| Zr | | 0.154 | 0.145 | 0.116 | 0.000 | 0.112 | 0.028 | 0.112 |
| Slag-forming material | | | | | | | | |
| $TiO_2$ | | 7.133 | 6.889 | 7.135 | 6.494 | 6.674 | 6.674 | 6.674 |
| $SiO_2$ | | 0.394 | 0.363 | 0.384 | 0.255 | 0.352 | 0.360 | 0.360 |
| $Al_2O_3$ | | 0.086 | 0.568 | 0.080 | 0.063 | 0.078 | 0.078 | 0.078 |
| $ZrO_2$ | | 0.168 | 0.000 | 0.000 | 0.000 | 0.000 | 0.000 | 0.000 |
| MgO | | 0.326 | 0.000 | 0.156 | 0.000 | 0.000 | 0.000 | 0.000 |
| $V_2O_6$ | | 0.006 | 0.006 | 0.012 | 0.006 | 0.006 | 0.006 | 0.006 |
| $Nb_2O_5$ | | 0.000 | 0.004 | 0.000 | 0.000 | 0.000 | 0.000 | 0.000 |
| $Na_2O$ | | 0.050 | 0.049 | 0.047 | 0.021 | 0.046 | 0.049 | 0.049 |
| $K_2O$ | | 0.039 | 0.037 | 0.037 | 0.028 | 0.036 | 0.036 | 0.036 |
| CaO | | 0.004 | 0.000 | 0.002 | 0.000 | 0.000 | 0.000 | 0.000 |
| $B_2O_3$ | | 0.028 | 0.026 | 0.026 | 0.007 | 0.025 | 0.028 | 0.028 |
| Fluoride compound | | | | | | | | |
| NaF | | 0.160 | 0.000 | 0.000 | 0.000 | 0.000 | 0.000 | 0.000 |
| $K_2SiF_6$ | | 0.135 | 0.286 | 0.286 | 0.233 | 0.277 | 0.277 | 0.277 |
| $CeF_3$ | | 0.042 | 0.040 | 0.000 | 0.000 | 0.039 | 0.039 | 0.039 |
| $CaF_2$ | | 0.033 | 0.000 | 0.156 | 0.000 | 0.000 | 0.000 | 0.000 |
| Total (Equivalent content) | | 0.171 | 0.180 | 0.224 | 0.120 | 0.155 | 0.155 | 0.155 |
| Other elements | | 0.030 | 0.017 | 0.042 | 0.005 | 0.016 | 0.017 | 0.017 |
| Total Ti/N | | 328 | 291 | 233 | 539 | 184 | 679 | 125 |

TABLE 9

| | | Wire No. | | | | | | |
|---|---|---|---|---|---|---|---|---|
| | | Example 15 | Example 16 | Example 17 | Example 18 | Example 19 | Example 20 | Example 21 |
| Sheath quality | | B | A | B | B | B | B | B |
| Flux ratio (% by mass) | | 15.5 | 15.5 | 15.5 | 15.0 | 16.0 | 16.0 | 16.0 |
| Slag-forming material content (% by mass) | | 7.649 | 7.502 | 7.146 | 8.730 | 7.512 | 8.592 | 6.256 |
| | | Composition (% by mass) | | | | | | |
| C | | 0.040 | 0.060 | 0.044 | 0.043 | 0.046 | 0.046 | 0.049 |
| Si | | 0.556 | 0.388 | 0.354 | 0.342 | 0.396 | 0.396 | 0.365 |
| Mn | | 1.169 | 1.124 | 1.228 | 1.192 | 1.268 | 1.265 | 1.150 |
| P | | 0.007 | 0.011 | 0.007 | 0.007 | 0.007 | 0.007 | 0.007 |
| S | | 0.005 | 0.007 | 0.005 | 0.004 | 0.006 | 0.005 | 0.005 |
| Cu | | 0.010 | 0.011 | 0.010 | 0.010 | 0.010 | 0.010 | 0.010 |
| Ni | | 0.010 | 0.012 | 0.010 | 0.010 | 0.010 | 0.010 | 0.010 |
| Cr | | 1.351 | 1.362 | 1.280 | 1.239 | 1.396 | 1.396 | 1.321 |
| Mo | | 0.457 | 0.460 | 0.457 | 0.443 | 0.472 | 0.472 | 0.452 |
| Al | Al | 0.007 | 0.032 | 0.007 | 0.007 | 0.007 | 0.007 | 0.007 |
| | $Al_2O_3$ (Equivalent Al content) | 0.041 | 0.041 | 0.047 | 0.032 | 0.043 | 0.043 | 0.042 |
| | Total | 0.048 | 0.073 | 0.054 | 0.039 | 0.050 | 0.050 | 0.049 |
| Ti | | 0.163 | 0.033 | 0.098 | 0.126 | 0.034 | 0.201 | 0.034 |
| Nb | Nb | 0.002 | 0.002 | 0.002 | 0.002 | 0.002 | 0.002 | 0.002 |
| | $Nb_2O_3$ (Equivalent Nb content) | 0.000 | 0.000 | 0.000 | 0.000 | 0.000 | 0.000 | 0.000 |
| | Total | 0.002 | 0.002 | 0.002 | 0.002 | 0.002 | 0.002 | 0.002 |
| V | V | 0.001 | 0.001 | 0.001 | 0.001 | 0.001 | 0.001 | 0.001 |
| | $V_2O_3$ (Equivalent V content) | 0.003 | 0.003 | 0.002 | 0.004 | 0.003 | 0.003 | 0.003 |
| | Total | 0.004 | 0.004 | 0.003 | 0.005 | 0.004 | 0.004 | 0.004 |
| B | B | 0.000 | 0.000 | 0.000 | 0.000 | 0.000 | 0.000 | 0.000 |
| | $B_2O_3$ (Equivalent B content) | 0.008 | 0.008 | 0.009 | 0.007 | 0.008 | 0.008 | 0.008 |
| | Total | 0.008 | 0.008 | 0.009 | 0.007 | 0.008 | 0.008 | 0.008 |
| N | | 0.008 | 0.007 | 0.023 | 0.023 | 0.015 | 0.014 | 0.024 |
| Mg | | 0.232 | 1.487 | 0.728 | 0.704 | 0.751 | 0.761 | 0.799 |
| Zr | | 0.112 | 0.000 | 0.000 | 0.000 | 0.000 | 0.000 | 0.000 |
| Slag-forming material | | | | | | | | |
| $TiO_2$ | | 6.674 | 6.674 | 4.336 | 8.017 | 6.889 | 6.889 | 5.355 |
| $SiO_2$ | | 0.352 | 0.352 | 0.861 | 0.280 | 0.363 | 0.364 | 0.363 |
| $Al_2O_3$ | | 0.078 | 0.078 | 0.089 | 0.060 | 0.080 | 0.080 | 0.080 |
| $ZrO_2$ | | 0.000 | 0.000 | 0.936 | 0.000 | 0.000 | 0.000 | 0.000 |
| MgO | | 0.000 | 0.000 | 0.455 | 0.000 | 0.000 | 0.000 | 0.000 |
| $V_2O_6$ | | 0.006 | 0.006 | 0.004 | 0.007 | 0.006 | 0.006 | 0.005 |
| $Nb_2O_5$ | | 0.000 | 0.000 | 0.000 | 0.000 | 0.000 | 0.000 | 0.000 |
| $Na_2O$ | | 0.046 | 0.046 | 0.052 | 0.041 | 0.047 | 0.047 | 0.047 |
| $K_2O$ | | 0.036 | 0.036 | 0.041 | 0.027 | 0.037 | 0.037 | 0.037 |
| CaO | | 0.000 | 0.000 | 0.007 | 0.000 | 0.000 | 0.000 | 0.000 |
| $B_2O_3$ | | 0.026 | 0.025 | 0.028 | 0.024 | 0.026 | 0.026 | 0.026 |
| Fluoride compound | | | | | | | | |
| NaF | | 0.000 | 0.000 | 0.000 | 0.000 | 0.000 | 0.452 | 0.000 |
| $K_2SiF_6$ | | 0.277 | 0.277 | 0.277 | 0.268 | 0.048 | 0.557 | 0.286 |
| $CeF_3$ | | 0.039 | 0.000 | 0.039 | 0.000 | 0.007 | 0.040 | 0.040 |
| $CaF_2$ | | 0.000 | 0.000 | 0.000 | 0.000 | 0.000 | 0.047 | 0.000 |
| Total (Equivalent content) | | 0.155 | 0.144 | 0.155 | 0.139 | 0.027 | 0.527 | 0.160 |
| Other elements | | 0.016 | 0.008 | 0.032 | 0.005 | 0.009 | 0.047 | 0.018 |
| Total Ti/N | | 517 | 558 | 115 | 218 | 287 | 299 | 135 |

TABLE 10

| | | Wire No. | | | | | | |
|---|---|---|---|---|---|---|---|---|
| | | Example 22 | Example 23 | Example 24 | Example 25 | Example 26 | Example 27 | Example 28 |
| Sheath quality | | B | C | C | C | C | A | B |
| Flux ratio (% by mass) | | 18.0 | 15.0 | 17.0 | 15.0 | 12.0 | 16.0 | 14.0 |
| Slag-forming material content (% by mass) | | 9.720 | 7.260 | 7.701 | 6.793 | 6.636 | 7.744 | 6.804 |
| | | Composition (% by mass) | | | | | | |
| C | | 0.054 | 0.049 | 0.051 | 0.048 | 0.043 | 0.068 | 0.043 |
| Si | | 0.410 | 0.563 | 0.434 | 0.493 | 0.453 | 0.368 | 0.447 |
| Mn | | 1.257 | 1.275 | 1.293 | 1.275 | 1.246 | 0.974 | 0.984 |
| P | | 0.007 | 0.004 | 0.004 | 0.004 | 0.003 | 0.012 | 0.007 |
| S | | 0.005 | 0.007 | 0.007 | 0.007 | 0.007 | 0.007 | 0.005 |
| Cu | | 0.009 | 0.011 | 0.011 | 0.011 | 0.011 | 0.011 | 0.010 |
| Ni | | 0.010 | 0.043 | 0.042 | 0.043 | 0.044 | 0.012 | 0.010 |
| Cr | | 1.483 | 1.269 | 1.253 | 1.341 | 1.293 | 1.522 | 2.250 |
| Mo | | 0.508 | 0.502 | 0.505 | 0.502 | 0.498 | 0.505 | 0.878 |
| Al | Al | 0.007 | 0.004 | 0.004 | 0.004 | 0.004 | 0.032 | 0.007 |
| | $Al_2O_3$ (Equivalent Al content) | 0.038 | 0.040 | 0.045 | 0.040 | 0.032 | 0.043 | 0.037 |
| | Total | 0.045 | 0.044 | 0.049 | 0.043 | 0.036 | 0.075 | 0.044 |
| Ti | | 0.114 | 0.002 | 0.144 | 0.127 | 0.002 | 0.001 | 0.001 |
| Nb | Nb | 0.002 | 0.002 | 0.002 | 0.002 | 0.002 | 0.002 | 0.002 |
| | $Nb_2O_3$ (Equivalent Nb content) | 0.000 | 0.000 | 0.000 | 0.000 | 0.000 | 0.000 | 0.000 |
| | Total | 0.002 | 0.002 | 0.002 | 0.002 | 0.002 | 0.002 | 0.002 |
| V | V | 0.001 | 0.003 | 0.002 | 0.003 | 0.003 | 0.001 | 0.001 |
| | $V_2O_3$ (Equivalent V content) | 0.004 | 0.003 | 0.003 | 0.003 | 0.003 | 0.003 | 0.003 |
| | Total | 0.005 | 0.006 | 0.005 | 0.006 | 0.006 | 0.004 | 0.004 |
| B | B | 0.000 | 0.000 | 0.000 | 0.000 | 0.000 | 0.000 | 0.000 |
| | $B_2O_3$ (Equivalent B content) | 0.009 | 0.007 | 0.008 | 0.007 | 0.006 | 0.008 | 0.008 |
| | Total | 0.009 | 0.007 | 0.008 | 0.007 | 0.006 | 0.008 | 0.008 |
| N | | 0.027 | 0.018 | 0.019 | 0.027 | 0.016 | 0.023 | 0.019 |
| Mg | | 0.899 | 0.674 | 0.764 | 0.674 | 0.539 | 0.799 | 0.699 |
| Zr | | 0.000 | 0.081 | 0.000 | 0.027 | 0.000 | 0.000 | 0.000 |
| Slag-forming material | | | | | | | | |
| $TiO_2$ | | 7.912 | 6.459 | 6.793 | 5.994 | 5.994 | 6.889 | 5.594 |
| $SiO_2$ | | 0.624 | 0.341 | 0.386 | 0.341 | 0.273 | 0.363 | 0.374 |
| $Al_2O_3$ | | 0.071 | 0.075 | 0.085 | 0.075 | 0.061 | 0.080 | 0.071 |
| $ZrO_2$ | | 0.604 | 0.000 | 0.000 | 0.000 | 0.000 | 0.000 | 0.094 |
| MgO | | 0.000 | 0.000 | 0.000 | 0.000 | 0.000 | 0.000 | 0.133 |
| $V_2O_6$ | | 0.007 | 0.006 | 0.006 | 0.005 | 0.005 | 0.006 | 0.005 |
| $Nb_2O_5$ | | 0.000 | 0.000 | 0.000 | 0.000 | 0.000 | 0.000 | 0.000 |
| $Na_2O$ | | 0.050 | 0.044 | 0.050 | 0.044 | 0.036 | 0.047 | 0.046 |
| $K_2O$ | | 0.033 | 0.035 | 0.039 | 0.035 | 0.028 | 0.037 | 0.030 |
| CaO | | 0.000 | 0.000 | 0.000 | 0.000 | 0.000 | 0.000 | 0.002 |
| $B_2O_3$ | | 0.029 | 0.024 | 0.027 | 0.024 | 0.019 | 0.026 | 0.025 |
| Fluoride compound | | | | | | | | |
| NaF | | 0.000 | 0.000 | 0.000 | 0.000 | 0.000 | 0.000 | 0.013 |
| $K_2SiF_6$ | | 0.322 | 0.268 | 0.304 | 0.268 | 0.215 | 0.286 | 0.250 |
| $CeF_3$ | | 0.045 | 0.000 | 0.000 | 0.000 | 0.000 | 0.000 | 0.116 |
| $CaF_2$ | | 0.000 | 0.000 | 0.000 | 0.000 | 0.000 | 0.000 | 0.014 |
| Total (Equivalent content) | | 0.180 | 0.139 | 0.157 | 0.139 | 0.111 | 0.148 | 0.176 |
| Other elements | | 0.024 | 0.008 | 0.010 | 0.008 | 0.006 | 0.009 | 0.035 |
| Total Ti/N | | 183 | 215 | 218 | 138 | 225 | 178 | 172 |

TABLE 11

| | | Wire No. | | | | | | |
|---|---|---|---|---|---|---|---|---|
| | | Example 1 | Example 2 | Example 3 | Example 4 | Example 5 | Example 6 | Example 7 |
| Sheath quality | | B | B | B | D | D | B | B |
| Flux ratio (% by mass) | | 15.0 | 15.0 | 15.5 | 16.0 | 14.0 | 13.0 | 15.0 |
| Slag-forming material content (% by mass) | | 7.290 | 7.245 | 7.487 | 7.216 | 6.314 | 7.215 | 8.325 |
| | | Composition (% by mass) | | | | | | |
| C | | 0.051 | 0.059 | 0.062 | 0.055 | 0.052 | 0.044 | 0.050 |
| Si | | 0.663 | 0.461 | 0.518 | 0.463 | 0.465 | 0.471 | 0.606 |
| Mn | | 1.037 | 1.035 | 1.062 | 1.251 | 1.232 | 1.236 | 1.240 |
| P | | 0.007 | 0.007 | 0.007 | 0.007 | 0.007 | 0.007 | 0.007 |
| S | | 0.005 | 0.005 | 0.005 | 0.005 | 0.005 | 0.004 | 0.004 |
| Cu | | 0.010 | 0.010 | 0.009 | 0.012 | 0.012 | 0.010 | 0.010 |
| Ni | | 0.010 | 0.010 | 0.010 | 0.026 | 0.027 | 0.010 | 0.010 |
| Cr | | 2.338 | 2.338 | 2.416 | 2.134 | 2.173 | 1.178 | 1.282 |
| Mo | | 0.940 | 0.940 | 0.972 | 0.994 | 1.007 | 0.400 | 0.462 |
| Al | Al | 0.007 | 0.007 | 0.007 | 0.002 | 0.002 | 0.007 | 0.007 |
| | $Al_2O_3$ (Equivalent Al content) | 0.040 | 0.039 | 0.041 | 0.042 | 0.036 | 0.035 | 0.041 |
| | Total | 0.047 | 0.046 | 0.048 | 0.044 | 0.038 | 0.042 | 0.048 |
| Ti | | 0.001 | 0.126 | 0.130 | 0.135 | 0.001 | 0.001 | 0.126 |
| Nb | Nb | 0.002 | 0.002 | 0.002 | 0.002 | 0.002 | 0.002 | 0.002 |
| | $Nb_2O_3$ (Equivalent Nb content) | 0.000 | 0.000 | 0.000 | 0.000 | 0.000 | 0.000 | 0.000 |
| | Total | 0.002 | 0.002 | 0.002 | 0.002 | 0.002 | 0.002 | 0.002 |
| V | V | 0.001 | 0.001 | 0.001 | 0.003 | 0.003 | 0.001 | 0.001 |
| | $V_2O_3$ (Equivalent V content) | 0.003 | 0.003 | 0.003 | 0.003 | 0.003 | 0.003 | 0.004 |
| | Total | 0.004 | 0.004 | 0.004 | 0.006 | 0.006 | 0.004 | 0.005 |
| B | B | 0.000 | 0.000 | 0.000 | 0.000 | 0.000 | 0.000 | 0.000 |
| | $B_2O_3$ (Equivalent B content) | 0.008 | 0.006 | 0.006 | 0.006 | 0.005 | 0.008 | 0.009 |
| | Total | 0.008 | 0.006 | 0.006 | 0.006 | 0.005 | 0.008 | 0.009 |
| N | | 0.021 | 0.021 | 0.021 | 0.018 | 0.017 | 0.010 | 0.010 |
| Mg | | 0.749 | 0.749 | 0.774 | 0.799 | 0.699 | 1.273 | 0.749 |
| Zr | | 0.136 | 0.000 | 0.028 | 0.029 | 0.025 | 0.094 | 0.183 |
| Slag-forming material | | | | | | | | |
| $TiO_2$ | | 5.994 | 5.994 | 6.194 | 6.394 | 5.594 | 6.494 | 7.493 |
| $SiO_2$ | | 0.401 | 0.378 | 0.390 | 0.347 | 0.304 | 0.309 | 0.357 |
| $Al_2O_3$ | | 0.076 | 0.074 | 0.077 | 0.079 | 0.069 | 0.066 | 0.077 |
| $ZrO_2$ | | 0.101 | 0.101 | 0.104 | 0.000 | 0.000 | 0.000 | 0.000 |
| MgO | | 0.143 | 0.143 | 0.148 | 0.000 | 0.000 | 0.000 | 0.000 |
| $V_2O_6$ | | 0.005 | 0.005 | 0.006 | 0.006 | 0.005 | 0.006 | 0.007 |
| $Nb_2O_5$ | | 0.000 | 0.000 | 0.000 | 0.000 | 0.000 | 0.000 | 0.000 |
| $Na_2O$ | | 0.050 | 0.040 | 0.041 | 0.042 | 0.037 | 0.044 | 0.051 |
| $K_2O$ | | 0.032 | 0.031 | 0.032 | 0.033 | 0.029 | 0.030 | 0.035 |
| CaO | | 0.002 | 0.002 | 0.002 | 0.000 | 0.000 | 0.000 | 0.000 |
| $B_2O_3$ | | 0.027 | 0.019 | 0.020 | 0.020 | 0.017 | 0.025 | 0.029 |
| Fluoride compound | | | | | | | | |
| NaF | | 0.014 | 0.014 | 0.015 | 0.000 | 0.000 | 0.000 | 0.000 |
| $K_2SiF_6$ | | 0.268 | 0.268 | 0.277 | 0.286 | 0.250 | 0.233 | 0.268 |
| $CeF_3$ | | 0.125 | 0.125 | 0.129 | 0.000 | 0.000 | 0.000 | 0.000 |
| $CaF_2$ | | 0.015 | 0.015 | 0.015 | 0.000 | 0.000 | 0.000 | 0.000 |
| Total (Equivalent content) | | 0.188 | 0.188 | 0.195 | 0.148 | 0.130 | 0.120 | 0.139 |
| Other elements | | 0.038 | 0.037 | 0.038 | 0.009 | 0.008 | 0.007 | 0.008 |
| Total Ti/N | | 174 | 180 | 181 | 215 | 194 | 400 | 450 |

TABLE 12

| Welding current (A) (DCEP) | Arc voltage (V) | Welding speed (cm/min) | Welding position | Shielding gas flow rate (l/min) | Preheating and interpass temperature (° C.) | Remarks |
|---|---|---|---|---|---|---|
| 270 | 27–32 | 25–30 | Flat positon | Refer to tables for composition, Flow rate: 25 | 176 ± 15 <br> 150 ± 15 | 2.25 Cr-1 Mo alloys <br> 1.25 Cr-0.5 Mo alloys <br> 0.5 Mo alloys |

TABLE 13

| Welding current (A) (DCEP) | Arc voltage (V) | Welding speed (cm/min) | Welding position | Shielding gas flow rate (l/min) | Preheating and interpass temperature (° C.) | Remarks |
|---|---|---|---|---|---|---|
| 180 | 22–26 | 20–30 | Vertical positon | Refer to tables for composition, Flow rate: 25 | 176 ± 15 <br> 150 ± 15 | 2.25 Cr-1 Mo alloys <br> 1.25 Cr-0.05 Mo alloys <br> 0.5 Mo alloys |

TABLE 14

| Flux-cored wires | Conditions for acceptable tansile property | | | Conditions for accectable impact performance |
|---|---|---|---|---|
| | 0.2%-Offset yield strength | Tensile strength | Elongation | 2 mmVE-18° C. |
| Comparative example 1–5, 7, 9–29 Example 1–5, 9–27, 34, 35 | Min. 470 Mpa | 560–650 Mpa | Min 19% | 55 J or above |
| Comparative example 6, 8 Example 6, 8, 28–33 | Min. 540 Mpa | 620–760 Mpa | Min 17% | |
| Example 7 | Min. 400 Mpa | 480–620 Mpa | Min 20% | |

Example 7: 620 ° C. × 1 hr, Furnace cooling
Others: 690 ° C. × 1 hr, Furnace cooling

TABLE 15

| Flux-cored wire | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|
| Designation of material plates | A387 Gr.11 Cl.2 | A387 Gr.11 Cl.2 | A387 Gr.11 Cl.2 | A387 Gr.11 Cl.2 | A387 Gr.11 Cl.2 | A387 Gr.11 Cl.2 | A387 Gr.11 Cl.2 | A387 Gr.11 Cl.2 |
| Shielding gas | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ |
| Chemical composition (% by mass) | | | | | | | | |
| C | 0.209 | 0.048 | 0.049 | 0.045 | 0.066 | 0.051 | 0.050 | 0.045 |
| Si | 0.73 | 0.06 | 1.56 | 0.58 | 0.62 | 0.68 | 0.65 | 0.47 |
| Mn | 1.06 | 1.01 | 1.02 | 0.39 | 1.17 | 1.00 | 1.00 | 0.99 |
| P | 0.007 | 0.007 | 0.008 | 0.007 | 0.007 | 0.007 | 0.007 | 0.007 |
| S | 0.009 | 0.010 | 0.009 | 0.009 | 0.009 | 0.009 | 0.009 | 0.010 |
| Cu | 0.015 | 0.015 | 0.015 | 0.015 | 0.015 | 0.014 | 0.015 | 0.014 |
| Ni | 0.015 | 0.015 | 0.015 | 0.015 | 0.015 | 0.015 | 0.015 | 0.015 |
| Cr | 1.48 | 1.28 | 1.28 | 1.21 | 1.21 | 2.56 | 1.35 | 2.31 |
| Mo | 0.56 | 0.56 | 0.56 | 0.46 | 0.46 | 1.06 | 0.32 | 1.70 |
| Al | 0.002 | 0.002 | 0.003 | 0.002 | 0.002 | 0.002 | 0.002 | 0.002 |
| Ti | 0.101 | 0.048 | 0.215 | 0.039 | 0.155 | 0.098 | 0.094 | 0.094 |
| Nb | 0.002 | 0.002 | 0.002 | 0.003 | 0.003 | 0.002 | 0.002 | 0.002 |
| V | 0.009 | 0.009 | 0.009 | 0.007 | 0.007 | 0.007 | 0.007 | 0.007 |
| B | 0.0049 | 0.0005 | 0.0049 | 0.0006 | 0.0040 | 0.0046 | 0.0046 | 0.0041 |
| N | 0.012 | 0.013 | 0.013 | 0.011 | 0.011 | 0.013 | 0.013 | 0.013 |
| Test Results | | | | | | | | |
| Usability | Good | Bad | Good | Good | Bad | Good | Good | Good |
| Radiographic examination | JIS Class 1 or below (HC) | JIS Class 1 or below (BH) | JIS Class 1 | JIS Class 1 or below (BH) | JIS Class 1 | JIS Class 1 | JIS Class 1 | JIS Class 1 |
| Tensile strength (MPa) | 732 | 572 | 728 | 541 | 740 | 775 | 545 | 769 |
| 0.2%-Offset yield strength (MPa) | 602 | 475 | 612 | 445 | 642 | 583 | 444 | 560 |
| Elongation (%) | 21 | 24 | 20 | 28 | 18 | 19 | 22 | 21 |
| 2 mmVE-18° C. (Avg. J) | 33 | 14 | 13 | 19 | 22 | 21 | 53 | 33 |

TABLE 15-continued

| Flux-cored wire | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|
| Ferrite band suppression | Acceptable | Unacceptable | Acceptable | Unacceptable | Acceptable | Acceptable | Acceptable | Acceptable |

*HC: Hot cracking  BH: Blow holes

TABLE 16

| Flux-cored wire | Comparative example 9 | Comparative example 10 | Comparative example 11 | Comparative example 12 | Comparative example 13 | Comparative example 14 | Comparative example 15 |
|---|---|---|---|---|---|---|---|
| Designation of material plates | A387 Gr.11 C1.2 | A387 Gr.11 C1.2 | A387 Gr.11 C1.2 | A387 Gr.11 C1.2 | A387 Gr.11 C1.2 | A387 Gr.11 C1.2 | A387 Gr.11 C1.2 |
| Shielding gas | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ |
| Chemical composition (% by mass) | | | | | | | |
| C | 0.055 | 0.062 | 0.053 | 0.053 | 0.053 | 0.052 | 0.047 |
| Si | 0.74 | 0.51 | 0.42 | 0.42 | 0.42 | 0.42 | 0.36 |
| Mn | 0.72 | 1.12 | 0.95 | 0.95 | 0.95 | 0.94 | 0.37 |
| P | 0.007 | 0.007 | 0.007 | 0.008 | 0.007 | 0.008 | 0.007 |
| S | 0.009 | 0.009 | 0.009 | 0.009 | 0.009 | 0.010 | 0.009 |
| Cu | 0.015 | 0.015 | 0.015 | 0.015 | 0.015 | 0.015 | 0.015 |
| Ni | 0.015 | 0.015 | 0.015 | 0.015 | 0.015 | 0.015 | 0.015 |
| Cr | 1.52 | 1.58 | 1.29 | 1.30 | 1.29 | 1.29 | 1.11 |
| Mo | 0.63 | 0.60 | 0.49 | 0.49 | 0.49 | 0.49 | 0.42 |
| Al | 0.022 | 0.022 | 0.002 | 0.002 | 0.002 | 0.002 | 0.002 |
| Ti | 0.169 | 0.204 | 0.081 | 0.069 | 0.081 | 0.074 | 0.088 |
| Nb | 0.002 | 0.002 | 0.019 | 0.018 | 0.003 | 0.013 | 0.003 |
| V | 0.007 | 0.008 | 0.010 | 0.022 | 0.031 | 0.026 | 0.007 |
| B | 0.0052 | 0.0052 | 0.0043 | 0.0043 | 0.0043 | 0.0043 | 0.0000 |
| N | 0.014 | 0.014 | 0.012 | 0.012 | 0.012 | 0.012 | 0.008 |
| Test Results | | | | | | | |
| Usability | Good | Good | Good | Good | Good | Good | Good |
| Radiographic examination | JIS Class 1 | JIS Class 1 | JIS Class 1 | JIS Class 1 | JIS Class 1 | JIS Class 1 | JIS Class 1 |
| Tensile strength (MPa) | 694 | 703 | 675 | 683 | 654 | 664 | 646 |
| 0.2%-Offset yield strength (MPa) | 597 | 599 | 590 | 595 | 565 | 559 | 558 |
| Elongation (%) | 25 | 23 | 24 | 24 | 23 | 23 | 25 |
| 2 mmVE-18° C. (Avg. J) | 5 | 7 | 11 | 13 | 21 | 25 | 9 |
| Ferrite band suppression | Acceptable | Acceptable | Acceptable | Acceptable | Acceptable | Acceptable | Acceptable |

TABLE 17

| Flux-cored wire | Comparative example 16 | Comparative example 17 | Comparative example 18 | Comparative example 19 | Comparative example 20 | Comparative example 21 | Comparative example 22 |
|---|---|---|---|---|---|---|---|
| Designation of material plates | A387 Gr.11 C1.2 | A387 Gr.11 C1.2 | A387 Gr.11 C1.2 | A387 Gr.11 C1.2 | A387 Gr.11 C1.2 | A387 Gr.11 C1.2 | A387 Gr.11 C1.2 |
| Shielding gas | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ |
| Chemical composition (% by mass) | | | | | | | |
| C | 0.047 | 0.047 | 0.047 | 0.048 | 0.053 | 0.054 | 0.050 |
| Si | 0.36 | 0.36 | 0.35 | 0.40 | 0.42 | 0.43 | 0.39 |
| Mn | 0.87 | 0.87 | 0.85 | 0.84 | 0.77 | 0.79 | 0.90 |
| P | 0.007 | 0.007 | 0.007 | 0.007 | 0.007 | 0.007 | 0.007 |
| S | 0.009 | 0.009 | 0.009 | 0.009 | 0.009 | 0.009 | 0.009 |
| Cu | 0.015 | 0.015 | 0.015 | 0.015 | 0.015 | 0.015 | 0.015 |
| Ni | 0.015 | 0.015 | 0.015 | 0.015 | 0.015 | 0.015 | 0.015 |
| Cr | 1.11 | 1.11 | 1.06 | 1.32 | 1.30 | 1.34 | 1.23 |
| Mo | 0.43 | 0.42 | 0.42 | 0.42 | 0.49 | 0.51 | 0.46 |
| Al | 0.002 | 0.002 | 0.002 | 0.002 | 0.002 | 0.002 | 0.013 |
| Ti | 0.089 | 0.088 | 0.088 | 0.088 | 0.042 | 0.151 | 0.040 |
| Nb | 0.003 | 0.003 | 0.003 | 0.003 | 0.003 | 0.002 | 0.002 |
| V | 0.007 | 0.007 | 0.007 | 0.007 | 0.007 | 0.007 | 0.005 |
| B | 0.0124 | 0.0132 | 0.0037 | 0.0037 | 0.0009 | 0.0045 | 0.0045 |
| N | 0.009 | 0.008 | 0.003 | 0.032 | 0.012 | 0.011 | 0.013 |

TABLE 17-continued

| Flux-cored wire | Comparative example 16 | Comparative example 17 | Comparative example 18 | Comparative example 19 | Comparative example 20 | Comparative example 21 | Comparative example 22 |
|---|---|---|---|---|---|---|---|
| Test Results | | | | | | | |
| Usability | Good | Good | Good | Bad | Good | Bad | Bad |
| Radiographic examination | JIS Class 1 or below (HC) | JIS Class 1 or below (HC) | JIS Class 1 | JIS Class 1 or below (BH) | JIS Class 1 or below (BH) | JIS Class 1 | JIS Class 1 |
| Tensile strength (MPa) | 674 | 675 | 563 | 649 | 652 | 663 | 673 |
| 0.2%-Offset yield strength (MPa) | 569 | 558 | 567 | 538 | 559 | 561 | 569 |
| Elongation (%) | 25 | 24 | 25 | 22 | 25 | 25 | 25 |
| 2 mmVE-18° C. (Avg. J) | 67 | 57 | 33 | 15 | 11 | 32 | 59 |
| Ferrite band suppression | Acceptable | Acceptable | Unacceptable | Acceptable | Unacceptable | Acceptable | Unacceptable |

*HC: Hot cracking   BH: Blow holes

TABLE 18

| Flux-cored wire | Comparative example 23 | Comparative example 24 | Comparative example 25 | Comparative example 26 | Comparative example 27 | Comparative example 28 | Comparative example 29 |
|---|---|---|---|---|---|---|---|
| Designation of material plates | A387 Gr.11 Cl.2 | A387 Gr.11 Cl.2 | A387 Gr.11 Cl.2 | A387 Gr.11 Cl.2 | A387 Gr.11 Cl.2 | A387 Gr.11 Cl.2 | A387 Gr.11 Cl.2 |
| Shielding gas | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ |
| Chemical composition (% by mass) | | | | | | | |
| C | 0.042 | 0.048 | 0.056 | 0.057 | 0.050 | 0.057 | 0.049 |
| Si | 0.41 | 0.36 | 0.44 | 0.05 | 0.39 | 0.36 | 0.38 |
| Mn | 0.91 | 0.85 | 0.93 | 0.37 | 0.82 | 0.76 | 0.93 |
| P | 0.007 | 0.007 | 0.007 | 0.007 | 0.007 | 0.007 | 0.007 |
| S | 0.009 | 0.009 | 0.009 | 0.010 | 0.009 | 0.009 | 0.009 |
| Cu | 0.015 | 0.015 | 0.015 | 0.015 | 0.015 | 0.015 | 0.015 |
| Ni | 0.015 | 0.015 | 0.015 | 0.015 | 0.015 | 0.015 | 0.015 |
| Cr | 1.32 | 1.13 | 1.36 | 1.33 | 1.22 | 1.12 | 1.25 |
| Mo | 0.47 | 0.43 | 0.53 | 0.53 | 0.46 | 0.60 | 0.46 |
| Al | 0.002 | 0.002 | 0.002 | 0.002 | 0.006 | 0.022 | 0.002 |
| Ti | 0.116 | 0.046 | 0.100 | 0.045 | 0.048 | 0.204 | 0.096 |
| Nb | 0.003 | 0.003 | 0.003 | 0.002 | 0.002 | 0.002 | 0.003 |
| V | 0.009 | 0.009 | 0.009 | 0.007 | 0.005 | 0.008 | 0.009 |
| B | 0.0045 | 0.0009 | 0.0041 | 0.0009 | 0.0044 | 0.0047 | 0.0135 |
| N | 0.012 | 0.011 | 0.013 | 0.012 | 0.013 | 0.034 | 0.033 |
| Test Results | | | | | | | |
| Usability | Good | Bad | Bad | Bad | Bad | Bad | Bad |
| Radiographic examination | JIS Class 1 or below (SI) | JIS Class 1 or below (BH) | JIS Class 1 | JIS Class 1 or below (BH) | JIS Class 1 | JIS Class 1 or below (BH) | JIS Class 1 or below (BH, HC) |
| Tensile strength (MPa) | 679 | 654 | 665 | 532 | 573 | 712 | 673 |
| 0.2%-Offset yield strength (MPa) | 585 | 560 | 573 | 445 | 485 | 625 | 565 |
| Elongation (%) | 26 | 26 | 25 | 23 | 25 | 18 | 21 |
| 2 mmVE-18° C. (Avg. J) | 38 | 13 | 65 | 13 | 69 | 18 | 13 |
| Ferrite band suppression | Acceptable | Unacceptable | Acceptable | Unacceptable | Unacceptable | Acceptable | Acceptable |

*HC: Hot cracking   BH: Blow holes   SI: Slug inclusion

TABLE 19

| Flux-cored wire | Example 1 | Example 2 | Example 3 | Example 4 | Example 5 | Example 6 | Example 7 |
|---|---|---|---|---|---|---|---|
| Designation of material plates | A387 Gr.11 Cl.2 | A387 Gr.11 Cl.2 | A387 Gr.11 Cl.2 | A387 Gr.11 Cl.2 | A387 Gr.11 Cl.2 | A387 Gr.22 Cl.2 | A204 Gr.A |
| Shielding gas | 80% Ar + 20% $CO_2$ | 80% Ar + 20% $CO_2$ | 100% $CO_2$ | 100% $CO_2$ | 100% $CO_2$ | 80% Ar + 20% $CO_2$ | 80% Ar + 20% $CO_2$ |
| Chemical composition (% by mass) | | | | | | | |
| C | 0.147 | 0.043 | 0.044 | 0.054 | 0.053 | 0.042 | 0.043 |
| Si | 0.53 | 0.08 | 0.73 | 0.37 | 0.24 | 0.39 | 0.41 |
| Mn | 0.46 | 0.88 | 0.57 | 0.41 | 1.12 | 0.73 | 0.78 |
| P | 0.012 | 0.007 | 0.007 | 0.007 | 0.007 | 0.007 | 0.007 |
| S | 0.013 | 0.010 | 0.009 | 0.010 | 0.010 | 0.010 | 0.009 |
| Cu | 0.018 | 0.015 | 0.015 | 0.015 | 0.015 | 0.015 | 0.015 |
| Ni | 0.018 | 0.015 | 0.015 | 0.015 | 0.015 | 0.015 | 0.015 |

TABLE 19-continued

| Flux-cored wire | Example 1 | Example 2 | Example 3 | Example 4 | Example 5 | Example 6 | Example 7 |
|---|---|---|---|---|---|---|---|
| Cr | 1.08 | 1.24 | 1.19 | 1.44 | 1.44 | 2.40 | 0.11 |
| Mo | 0.42 | 0.49 | 0.48 | 0.58 | 0.58 | 1.07 | 0.52 |
| Al | 0.003 | 0.002 | 0.003 | 0.002 | 0.002 | 0.002 | 0.002 |
| Ti | 0.088 | 0.088 | 0.078 | 0.099 | 0.099 | 0.074 | 0.080 |
| Nb | 0.003 | 0.003 | 0.002 | 0.002 | 0.002 | 0.003 | 0.003 |
| V | 0.007 | 0.007 | 0.006 | 0.008 | 0.008 | 0.006 | 0.007 |
| B | 0.0043 | 0.0043 | 0.0043 | 0.0052 | 0.0052 | 0.0039 | 0.0042 |
| N | 0.011 | 0.011 | 0.011 | 0.013 | 0.013 | 0.010 | 0.013 |
| Test Results | | | | | | | |
| Usability | Good | Good | Good | Good | Good | Good | Good |
| Radiographic examination | JIS Class 1 | JIS Class 1 | JIS Class 1 | JIS Class 1 | JIS Class 1 | JIS Class 1 | JIS Class 1 |
| Tensile strength (MPa) | 682 | 673 | 685 | 683 | 683 | 696 | 579 |
| 0.2%-Offset yield strength (MPa) | 595 | 595 | 598 | 589 | 589 | 602 | 483 |
| Elongation (%) | 20 | 25 | 25 | 24 | 24 | 25 | 26 |
| 2 mmVE-18° C. (Avg. J) | 120 | 109 | 108 | 125 | 125 | 121 | 82 |
| Ferrite band suppression | Acceptable | Acceptable | Acceptable | Acceptable | Acceptable | Acceptable | Acceptable |

TABLE 20

| Flux-cored wire | Example 8 | Example 9 | Example 10 | Example 11 | Example 12 | Example 13 | Example 14 |
|---|---|---|---|---|---|---|---|
| Designation of material plates | A387 Gr.22 C1.2 | A387 Gr.11 C1.2 | A387 Gr.11 C1.2 | A387 Gr.11 C1.2 | A387 Gr.11 C1.2 | A387 Gr.11 C1.2 | A387 Gr.11 C1.2 |
| Shielding gas | 100% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ |
| Chemical composition (% by mass) | | | | | | | |
| C | 0.077 | 0.059 | 0.057 | 0.048 | 0.055 | 0.054 | 0.055 |
| Si | 0.40 | 0.69 | 0.47 | 0.44 | 0.58 | 0.43 | 0.58 |
| Mn | 0.86 | 1.01 | 0.98 | 0.73 | 0.98 | 0.89 | 0.89 |
| P | 0.012 | 0.007 | 0.007 | 0.007 | 0.007 | 0.007 | 0.007 |
| S | 0.015 | 0.009 | 0.009 | 0.009 | 0.009 | 0.009 | 0.009 |
| Cu | 0.017 | 0.015 | 0.015 | 0.015 | 0.015 | 0.015 | 0.015 |
| Ni | 0.018 | 0.015 | 0.015 | 0.015 | 0.015 | 0.015 | 0.015 |
| Cr | 1.31 | 1.40 | 1.19 | 1.11 | 1.23 | 1.17 | 1.30 |
| Mo | 1.17 | 0.53 | 0.52 | 0.45 | 0.51 | 0.51 | 0.51 |
| Al | 0.003 | 0.020 | 0.002 | 0.002 | 0.002 | 0.002 | 0.002 |
| Ti | 0.095 | 0.114 | 0.095 | 0.083 | 0.115 | 0.110 | 0.110 |
| Nb | 0.002 | 0.003 | 0.007 | 0.003 | 0.002 | 0.002 | 0.002 |
| V | 0.008 | 0.007 | 0.013 | 0.007 | 0.007 | 0.007 | 0.007 |
| B | 0.0051 | 0.0045 | 0.0045 | 0.0014 | 0.0104 | 0.0050 | 0.0050 |
| N | 0.012 | 0.013 | 0.016 | 0.006 | 0.020 | 0.005 | 0.028 |
| Test Results | | | | | | | |
| Usability | Good | Good | Good | Good | Good | Good | Good |
| Radiographic examination | JIS Class 1 | JIS Class 1 | JIS Class 1 | JIS Class 1 | JIS Class 1 | JIS Class 1 | JIS Class 1 |
| Tensile strength (MPa) | 716 | 673 | 663 | 661 | 681 | 653 | 679 |
| 0.2%-Offset yield strength (MPa) | 623 | 591 | 572 | 562 | 578 | 562 | 567 |
| Elongation (%) | 25 | 25 | 25 | 27 | 24 | 27 | 23 |
| 2 mmVE-18° C. (Avg. J) | 118 | 108 | 92 | 62 | 75 | 89 | 76 |
| Ferrite band suppression | Acceptable | Acceptable | Acceptable | Acceptable | Acceptable | Acceptable | Acceptable |

TABLE 21

| Flux-cored wire | Example 15 | Example 16 | Example 17 | Example 18 | Example 19 | Example 20 | Example 21 |
|---|---|---|---|---|---|---|---|
| Designation of material plates | A387 Gr.11 C1.2 | A387 Gr.11 C1.2 | A387 Gr.11 C1.2 | A387 Gr.11 C1.2 | A387 Gr.11 C1.2 | A387 Gr.11 C1.2 | A387 Gr.11 C1.2 |
| Shielding gas | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ |
| Chemical composition (% by mass) | | | | | | | |
| C | 0.049 | 0.073 | 0.053 | 0.052 | 0.055 | 0.056 | 0.058 |
| Si | 0.61 | 0.43 | 0.39 | 0.38 | 0.43 | 0.44 | 0.40 |
| Mn | 0.85 | 0.82 | 0.89 | 0.88 | 0.92 | 0.93 | 0.82 |
| P | 0.007 | 0.012 | 0.008 | 0.007 | 0.007 | 0.007 | 0.007 |
| S | 0.009 | 0.013 | 0.009 | 0.010 | 0.009 | 0.009 | 0.009 |
| Cu | 0.015 | 0.017 | 0.015 | 0.015 | 0.015 | 0.015 | 0.015 |
| Ni | 0.015 | 0.017 | 0.015 | 0.015 | 0.015 | 0.015 | 0.015 |
| Cr | 1.30 | 1.30 | 1.23 | 1.21 | 1.34 | 1.36 | 1.25 |
| Mo | 0.51 | 0.51 | 0.51 | 0.50 | 0.52 | 0.53 | 0.50 |

TABLE 21-continued

| Flux-cored wire | Example 15 | Example 16 | Example 17 | Example 18 | Example 19 | Example 20 | Example 21 |
|---|---|---|---|---|---|---|---|
| Al | 0.002 | 0.003 | 0.002 | 0.002 | 0.002 | 0.002 | 0.002 |
| Ti | 0.113 | 0.109 | 0.073 | 0.135 | 0.113 | 0.118 | 0.087 |
| Nb | 0.002 | 0.002 | 0.002 | 0.003 | 0.002 | 0.003 | 0.002 |
| V | 0.007 | 0.007 | 0.005 | 0.008 | 0.007 | 0.007 | 0.005 |
| B | 0.0045 | 0.0045 | 0.0050 | 0.0044 | 0.0046 | 0.0047 | 0.0045 |
| N | 0.007 | 0.006 | 0.020 | 0.020 | 0.013 | 0.013 | 0.021 |
| Test Results | | | | | | | |
| Usability | Good | Good | Good | Good | Good | Good | Good |
| Radiographic examination | JIS Class 1 | JIS Class 1 | JIS Class 1 | JIS Class 1 | JIS Class 1 | JIS Class 1 | JIS Class 1 |
| Tensile strength (MPa) | 649 | 665 | 647 | 673 | 660 | 673 | 662 |
| 0.2%-Offset yield strength (MPa) | 538 | 561 | 552 | 569 | 553 | 561 | 565 |
| Elongation (%) | 28 | 26 | 24 | 22 | 24 | 25 | 24 |
| 2 mmVE-18° C. (Avg. J) | 95 | 88 | 84 | 76 | 113 | 115 | 82 |
| Ferrite band suppression | Acceptable | Acceptable | Acceptable | Acceptable | Acceptable | Acceptable | Acceptable |

TABLE 22

| Flux-cored wire | Example 22 | Example 23 | Example 24 | Example 25 | Example 26 | Example 27 | Example 28 |
|---|---|---|---|---|---|---|---|
| Designation of material plates | A387 Gr.11 C1.2 | A387 Gr.11 C1.2 | A387 Gr.11 C1.2 | A387 Gr.11 C1.2 | A387 Gr.11 C1.2 | A387 Gr.11 C1.2 | A387 Gr.11 C1.2 |
| Shielding gas | 80% Ar + 20% $CO_2$ | 98% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ |
| Chemical composition (% by mass) | | | | | | | |
| C | 0.067 | 0.059 | 0.061 | 0.058 | 0.051 | 0.082 | 0.051 |
| Si | 0.46 | 0.63 | 0.48 | 0.54 | 0.49 | 0.41 | 0.49 |
| Mn | 0.94 | 1.10 | 0.94 | 0.92 | 0.90 | 0.71 | 0.71 |
| P | 0.008 | 0.004 | 0.004 | 0.004 | 0.004 | 0.012 | 0.007 |
| S | 0.009 | 0.014 | 0.014 | 0.014 | 0.013 | 0.013 | 0.009 |
| Cu | 0.015 | 0.017 | 0.017 | 0.017 | 0.017 | 0.017 | 0.015 |
| Ni | 0.015 | 0.063 | 0.061 | 0.062 | 0.064 | 0.017 | 0.015 |
| Cr | 1.46 | 1.30 | 1.21 | 1.28 | 1.23 | 1.47 | 2.15 |
| Mo | 0.58 | 0.56 | 0.56 | 0.55 | 0.55 | 0.56 | 0.97 |
| Al | 0.002 | 0.002 | 0.002 | 0.002 | 0.002 | 0.003 | 0.002 |
| Ti | 0.135 | 0.104 | 0.114 | 0.100 | 0.081 | 0.094 | 0.076 |
| Nb | 0.003 | 0.003 | 0.002 | 0.002 | 0.003 | 0.002 | 0.002 |
| V | 0.008 | 0.010 | 0.009 | 0.009 | 0.010 | 0.007 | 0.006 |
| B | 0.0053 | 0.0043 | 0.0049 | 0.0043 | 0.0034 | 0.0046 | 0.0045 |
| N | 0.024 | 0.016 | 0.017 | 0.023 | 0.014 | 0.020 | 0.017 |
| Test Results | | | | | | | |
| Usability | Good | Good | Good | Good | Good | God | Good |
| Radiographic examination | JIS Class 1 | JIS Class 1 | JIS Class 1 | JIS Class 1 | JIS Class 1 | JIS Class 1 | JIS Class 1 |
| Tensile strength (MPa) | 672 | 659 | 662 | 667 | 672 | 680 | 721 |
| 0.2%-Offset yield strength (MPa) | 574 | 549 | 553 | 559 | 562 | 579 | 630 |
| Elongation (%) | 23 | 24 | 25 | 24 | 26 | 24 | 26 |
| 2 mmVE-18° C. (Avg. J) | 78 | 79 | 88 | 81 | 65 | 68 | 63 |
| Ferrite band suppression | Acceptable | Acceptable | Acceptable | Acceptable | Acceptable | Acceptable | Acceptable |

TABLE 23

| Flux-cored wire | Example 29 | Example 30 | Example 31 | Example 32 | Example 33 | Example 34 | Example 35 |
|---|---|---|---|---|---|---|---|
| Designation of material plates | A387 Gr.22 C1.2 | A387 Gr.11 C1.2 | A387 Gr.11 C1.2 | A387 Gr.11 C1.2 | A387 Gr.11 C1.2 | A387 Gr.11 C1.2 | A387 Gr.11 C1.2 |
| Shielding gas | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ | 80% Ar + 20% $CO_2$ |
| Chemical composition (% by mass) | | | | | | | |
| C | 0.073 | 0.071 | 0.074 | 0.066 | 0.061 | 0.053 | 0.061 |
| Si | 0.73 | 0.50 | 0.57 | 0.51 | 0.50 | 0.51 | 0.67 |
| Mn | 0.75 | 0.75 | 0.77 | 0.91 | 0.88 | 0.90 | 0.91 |
| P | 0.007 | 0.007 | 0.007 | 0.007 | 0.007 | 0.007 | 0.007 |
| S | 0.009 | 0.010 | 0.010 | 0.010 | 0.010 | 0.009 | 0.009 |
| Cu | 0.015 | 0.015 | 0.015 | 0.018 | 0.018 | 0.015 | 0.015 |
| Ni | 0.015 | 0.015 | 0.015 | 0.038 | 0.039 | 0.015 | 0.015 |
| Cr | 2.24 | 2.24 | 2.32 | 2.05 | 2.06 | 1.13 | 1.24 |
| Mo | 1.04 | 1.04 | 1.08 | 1.10 | 1.10 | 0.44 | 0.52 |
| Al | 0.002 | 0.002 | 0.002 | 0.002 | 0.002 | 0.002 | 0.002 |
| Ti | 0.082 | 0.100 | 0.104 | 0.107 | 0.075 | 0.088 | 0.106 |

TABLE 23-continued

| Flux-cored wire | Example 29 | Example 30 | Example 31 | Example 32 | Example 33 | Example 34 | Example 35 |
|---|---|---|---|---|---|---|---|
| Nb | 0.002 | 0.002 | 0.002 | 0.002 | 0.002 | 0.003 | 0.003 |
| V | 0.007 | 0.007 | 0.007 | 0.010 | 0.011 | 0.007 | 0.008 |
| B | 0.0049 | 0.0034 | 0.0036 | 0.0036 | 0.0031 | 0.0046 | 0.0053 |
| N | 0.018 | 0.018 | 0.019 | 0.016 | 0.015 | 0.008 | 0.009 |
| Test Results | | | | | | | |
| Usability | Good | Good | Good | Good | Good | Good | Good |
| Radiographic examination | JIS Class 1 | JIS Class 1 | JIS Class 1 | JIS Class 1 | JIS Class 1 | JIS Class 1 | JIS Class 1 |
| Tensile strength (MPa) | 732 | 742 | 748 | 746 | 732 | 675 | 678 |
| 0.2%-Offset yield strength (MPa) | 641 | 651 | 653 | 655 | 631 | 573 | 569 |
| Elongation (%) | 26 | 26 | 25 | 25 | 25 | 24 | 25 |
| 2 mmVE-18° C. (Avg. J) | 81 | 83 | 89 | 89 | 81 | 132 | 110 |
| Ferrite band suppression | Acceptable | Acceptable | Acceptable | Acceptable | Acceptable | Acceptable | Acceptable |

What is claimed is:

1. A flux-cored wire for gas-shielded arc welding comprising:

a steel sheath, and a flux filled in the steel sheath;

wherein the flux-cored wire has, on the basis of the total mass of the flux-cored wire, a C content of 0.20% by mass or below, a Si content in the range of 0.06 to 1.10% by mass, a Mn content in the range of 0.55 to 1.60% by mass, a Cr content of 2.60% by mass or below, a Mo content in the range of 0.30 to 1.50% by mass, a Mg content in the range of 0.20 to 1.50% by mass, a N content in the range of 0.005 to 0.035% by mass and a B content in the range of 0.001 to 0.020% by mass the flux has, on the basis of the total mass of the flux-cored wire, a $TiO_2$ content in the range of 4.2 to 8.2% by mass and a fluorine compound content in terms of F content in the range of 0.025 to 0.55% by mass, and the flux-cored wire has, on the basis of the total mass of the flux-cored wire, an Al content of 0.50% by mass or below, a Nb content of 0.015% by mass or below, and a V content of 0.015% by mass or below.

2. The flux-cored wire for gas-shielded arc welding according to claim 1, wherein the Mn content is in the range of 0.55 to 1.45% by mass on the basis of the total mass of the flux-cored wire.

3. The flux-cored wire for gas-shielded arc welding according to claim 1 further containing, on the basis of the total mass of the flux-cored wire, at least one selected from the group consisting of Ti other than $TiO_2$ in a Ti content in the range of 0.005 to 0.3% by mass and Zr in a Zr content in the range of 0.002 to 0.3% by mass.

4. The flux-cored wire according to claim 1, wherein the ratio of total Ti content to N content is in the range of 250 to 500, the total Ti content and the N content being the Ti content and the N content on the basis of the total mass of the flux-cored wire.

* * * * *

UNITED STATES PATENT AND TRADEMARK OFFICE
CERTIFICATE OF CORRECTION

PATENT NO. : 6,940,042 B2
DATED : September 6, 2005
INVENTOR(S) : Hara et al.

It is certified that error appears in the above-identified patent and that said Letters Patent is hereby corrected as shown below:

<u>Title page,</u>
Item [73], Assignee, should read -- Kabushiki Kaisha Kobe Seiko Sho (Kobe Steel, Ltd.) Kobe (JP) --.

Signed and Sealed this

Eighth Day of November, 2005

JON W. DUDAS
*Director of the United States Patent and Trademark Office*